United States Patent

Ohta et al.

[11] Patent Number: 5,889,862
[45] Date of Patent: Mar. 30, 1999

[54] METHOD AND APPARATUS FOR IMPLEMENTING TRACEABLE ELECTRONIC CASH

[75] Inventors: Kazuo Ohta, Zushi; Eiichiro Fujisaki, Yokosuka; Atsushi Fujioka; Masayuki Abe, both of Yokohama, all of Japan

[73] Assignee: Nippon Telegraph and Telephone Corporation, Tokyo, Japan

[21] Appl. No.: 683,538

[22] Filed: Jul. 15, 1996

[30] Foreign Application Priority Data

| Jul. 17, 1995 | [JP] | Japan | 7-180281 |
| Sep. 25, 1995 | [JP] | Japan | 7-246415 |
| Sep. 25, 1995 | [JP] | Japan | 7-246416 |

[51] Int. Cl.$^6$ .............................. H04L 9/30; H04L 9/32
[52] U.S. Cl. ............................. 380/24; 380/30; 705/39
[58] Field of Search ................................. 380/23, 24, 25; 705/39

[56] References Cited

U.S. PATENT DOCUMENTS

| 4,977,595 | 12/1990 | Ohta et al. | 380/24 |
| 5,224,162 | 6/1993 | Okamoto et al. | 380/24 |
| 5,521,980 | 5/1996 | Brands | 380/30 |
| 5,642,419 | 6/1997 | Rosen | 380/23 |

FOREIGN PATENT DOCUMENTS

0518365A2  6/1992  European Pat. Off. .

OTHER PUBLICATIONS

David Chaum, et al., *Untraceable Electronic Cash*, Center for Mathematics and Computer Science, pp. 319–327.

*Primary Examiner*—Gilberto Barrón, Jr.
*Assistant Examiner*—Carmen D. White
*Attorney, Agent, or Firm*—Pollock, Vande Sande & Amernick

[57] ABSTRACT

In a method for implementing traceable electronic cash, a user US sends a bank BK a product N of prime numbers P and Q, a prime number L and his real name $ID_U$, and the bank BK generates a pseudonym I corresponding to the real name $ID_U$ and keeps the correspondence between the real name $ID_U$ and the pseudonym I secret. The bank BK uses a signature function $\Omega = D_{eB}(N,L,I)$ to attach a signature to information composed of the above-mentioned N, L and I and sends the user US the signed information $\Omega$ as information containing a license B. The user US generates authentication information X from the N and a random number R and sends the bank BK information Z obtained by performing blind signature preprocessing on information (X,B) with a function $F_{eC}$ and has the information Z signed by the bank BK with a signature function $D_{eC}(Z)$ to obtain electronic cash C. When the user US abuses the electronic cash C, the bank BK follows a court order to reveal the correspondence between the real name $ID_U$ and pseudo name of the user US and trace the electronic cash spent.

18 Claims, 17 Drawing Sheets

METHOD AND APPARATUS FOR IMPLEMENTING TRACEABLE ELECTRONIC CASH

BACKGROUND OF THE INVENTION

The present invention relates to a method and apparatus for implementing electronic cash through utilization of an electrical communication system.

Electronic cash will probably come into wide use with a smart card as an electronic wallet. It is desirable, in such an instance, that electronic cash be stored as information in the electronic wallet without depending on any physical medium.

One possible approach to realizing electronic cash is to provide system security by physical means. The security protection of prepaid cards such as telephone cards is guaranteed mainly by difficulty in physically copying their magnetic records to other cards. However, recent scientific and technological advances have come to diminish or endanger the card security based on such a premise. Another disadvantage with this system is that electronic cash cannot be transferred as information over a communication line because it is always offered as a physical medium (magnetic card or the like).

Another approach is a scheme wherein customers use electronic ID cards such as credit cards (electronic credit cards or electronic checks) and settle accounts later on. With the electronic credit cards, the introduction of a digital signature as a substitute for a handwritten one enables their processing to be entirely electronized (computerized), permitting the transfer of settlement information over a communication line. With this system, however, it is impossible to ensure user privacy; the same goes for current credit cards and checks. That is to say, financial institutions that issue credit cards and settle accounts can freely get purchase histories of users and shops can also learn their credit card numbers and signatures.

The above-mentioned problems such as computerization of electronic cash, system security and user privacy could be solved by the combined use of a blind signature scheme (described in detail later) and an on-line check at the time of payment (a shop makes an on-line inquiry at the management center as to double/unauthorized spending of the electronic cash information presented by the user). This solution is, however, impractical taking into account that the access to the management center from the shop for each user's purchase involves such issues as the processing time (the user's waiting time), communication costs and on-line processing costs and data base maintenance and management costs at the management center. Hence, off-line processing is desirable for the processing at the time of cash payment.

There have been proposed electronic cash systems that permit off-line processing from the viewpoint of privacy protection, for example, in D. Chaum, A. Fiat and M. Naor, "Untraceable Electronic Cash," Advances in Cryptology-Crypt '88, Lecture Notes in Computer Science 403, pp. 319–327, Springer-Verlag, Berlin (1988), T. Okamoto et al, "Disposable Zero-Knowledge Authentications and Their Applications to Untraceable Electronic Cash," Advances in Cryptology-Crypt '89, Lecture Notes in Computer Science 435, pp.481–496, Springer-Verlag, Berlin (1989) and Japanese Pat. Appln. No. 88838/90 entitled "Method and Apparatus for Implementing Electronic Cash."

Now, a description will be given first of the blind signature scheme that is a basic technique for ensuring user privacy. The blind signature scheme has a signature attached by a signer to a document while keeping its contents secret. An RSA blind signature scheme is disclosed in U.S. Pat. No. 4,759,063 and D, Chaum, "Security without Identification: Transaction Systems to Make Big Brother Obsolete," Comm. Of the ACM, 28, 10, pp.1030–1044, and a blind signature scheme based on a zero knowledge interactive proof is described in T. Okamoto et al, "Divertible Zero-Knowledge Interactive Proofs and Commutative Random Self-Reducible," The Proc. Of Eurocrypt '89 (1989).

The blind signature demandant (user) creates a blind message x by randomizing the document m with a random number r through blind signature preprocessing. The signer calculates a provisional signature y corresponding to the blind message x through the use of a private key. At this time, the document m has been randomized by the blind message x, and hence is kept secret from the signer. The user excludes the influence of the random number r from the provisional signature y through blind signature postprocessing to obtain a true signature y' to the document m and sends a pair of document m and signature y' to a verifier, who uses a signer's public key to make a check to see if y' is the signature to the document m. The verifier cannot learn the correspondence between the provisional and true signatures y and y'.

Procedure for Blind Signature

Let A represent a signer, U a signature demandant and $e_A$ public information of the signer A. Let F represent a function indicating a blind signature preprocessing algorithm, D a function indicating a multiple blind signature algorithm and G a function indicating a blind signature postprocessing algorithm. The signer A uses the signature function $D_{eA}$ to generate a provisional signature $\Omega = D_{eA}(F_{eA}(m_1), \ldots, F_{eA}(m_k))$ from information created by the user US through the use of the preprocessing function functions $F_{eA}$, then the user US performs blind signature postprocessing $G_{eA}$ on the provisional signature $\Omega$, thereby computing a true signature $B = D_{eA}(m_1, \ldots, m_k)$ of the signer A for k messages $m_1, \ldots, m_k$. This procedure is executed by the signer A and the user US to create the multiple blind signature as described below.

Step 1: The user US generates k blind messages $x_i = \{F_{eA}(m_i) | i=1,2,\ldots,k\}$ from k messages $\{m_i | i=1,2,\ldots k\}$ by the blind signature preprocessing $F_{eA}$ and sends the k blind messages to the signer A. In this instance, the respective blind messages $x_i = F_{eA}(m_i)$ are calculated independently and the function $F_{eA}$ uses a random number to keep $m_i$ secret.

Step 2: The signer A generates the provisional signature $\Omega = D_{eA}(F_{eA}(m_1), \ldots, F_{eA}(m_k))$ from the k blind messages $F_{eA}(m_1), \ldots, F_{eA}(m_k)$ and sends it to the user US.

Step 3: The user US computes the true digital signature $B = D_{eA}(m_1, \ldots, m_k)$ of the signer A corresponding to the messages $m_1, \ldots, m_k$ by blind signature postprocessing using the function $G_{eA}$.

In the application of the RSA scheme to the blind signature, letting $r_i$ represent a random number and setting the blind message (blind signature preprocessing) $x_i$, the provisional signature y and the blind signature postprocessing $G_{eA}$ as follows:

$$x_i = F_{eA}(m_i) = r^{eA} \times m_i \bmod n,$$

$$Y = \Omega = D_{eA}(x_1, \ldots, x_k) = \pi_{1 \leq i \leq k}(x_i)^{dA} \bmod n,$$

$$G_{eA}(y) = \Omega/(r_1 \times \ldots \times r_k) \bmod n,$$

the signature y becomes as follows:

$$Y = B = \pi_{1 \leq i \leq k}(m_i)^{dA} \bmod n$$

In this case, the verification $V_{eA}(m_1, \ldots, m_k, B)$ of the signature B for the messages $m_1, \ldots, m_k$ is conducted depending on whether it satisfies the following equation:

$$\{\pi_{1\leq i\leq k}(m_i)\}^{eA}\equiv B(\bmod n)$$

If the equation is satisfied, then an output OK is provided. In the above, $(e_A,n)$ is a public key of the RSA scheme that the signer A uses, and letting P and Q represent large prime numbers, it satisfies the following equations:

$$n=P\times Q$$

$$e_A\times d_A\equiv 1(\bmod L)$$

where: L=LCM{(P−1),(Q−1)}
Where L=LCM{a,b} represents the least common multiple of a and b and a≡b(mod n) indicates that (a−b) is a multiple of n. When P and Q are very large prime numbers, it is very difficult, in general, to obtain P and Q by factoring n. Accordingly, even if n is made public, P and Q can be kept secret. In the following description, $d_A$ will sometimes be expressed as $1/e_A$. The Chaum-Fiat-Naor scheme will be described below on the assumption that k>1, and embodiments of the present invention will be described on the assumption that k=1.

An example of the configuration of the RSA cryptography is described in Rivest, R. L. Et al, "A Method for Obtaining Digital Signatures and Public-Key Cryptosystems," Communications of the ACM, Vol. 21, No. 2, pp.120–126(1978).

Methods for constructing the blind signature scheme are disclosed in, for example, Chaum, D., "Blind Signature systems," U.S. Pat. No. 4,759,063 and Ohta, K. Et al, "Authentication system and Apparatus Therefor," U.S. Pat. No. 4,969,189.

The user privacy can be guaranteed by the use of the blind signature solely on the user's own responsibility. That is, since the user adds and remove the random number r to and from the blind signature, no one can learn the correspondence between y=Ω and y'=B as long as the random number r is kept secret. However, it is pointed out in S. Von Solms and D. Naccache, "On Blind Signature and Perfect Crimes," Computers and Security, 11, pp.581–583 (1992) that there is a fear of the scheme being abused for perfect crimes of money laundering and kidnapping because the scheme can make the flow of money completely untraceable.

Next, a description will be given of electronic cash issue processing between a bank and a customer, payment with electronic cash by the customer at a shop and settlement processing between the shop and the bank in the Chaum·Fiat·Naor scheme that is a typical electronic cash scheme.

Processing for Issuing Electronic Cash

A procedure will be described which the user US follows to have a bank BK issue electronic cash C. Now, let ID represent identification information of the user US and eA a public key for a digital signature of the bank BK corresponding to the amount of money (ten thousand yen, for instance) of electronic cash specified that the user US specifies. The user US gets the bank BK to issue electronic cash as described below.

Step 1: The user US creates a predetermined random number $a_i$ (where i=1, . . . , K) and then calculates $x_i$ and $y_i$ using a one-way function g made public as follows:

$$x_i=g(a_i)$$

$$y_i=g(a_i(+)ID)$$

where (+) indicates an exclusive-OR.
Step 2: The user US calculates $W_i$ using a one-way function f made public and a blind signature preprocessing function $F_{eA}$ and presents it to the bank BK.

$$W_i=F_{eA}(f(x_i,Y_i))$$

Step 3: The bank BK selects K/2 subsets H+={$i_j$} (where j=1, . . . , K/2 and $1\leq i_j\leq K$) randomly among 1 to K and sends them as a disclosure request to the user US. For the brevity of description, let it be assumed that H={K/2+1,K/2+2, . . . , K} is designated as the disclosure request. A procedure for requesting the disclosure of K/2 subsets randomly selected from K subsets is called a cut-and-choose method.

Step 4: Upon receiving the disclosure request from the bank BK, the user US discloses to the bank BK the requested K/2 random numbers $a_i$ and the random number $a_i$ used in the function $F_{eA}$ to calculate $W_i$.

Step 5: The bank BK verifies the validity of all of the disclosed K/2 groups and, if any one of the verifications fails, halts the subsequent processing. When all the verifications succeed, the bank BK performs the following procedure for i (where i=1,2, . . . K/2) which are not the object of disclosure.

Step 6: The bank BK calculates and sends Ω to the user US.

$$\Omega=D_{eA}(W_1,\ldots,W_{K/2})$$

Step 7: The user US calculates the electronic cash C from the data Ω received from the bank BK as follows:

$$C=G_{eA}(\Omega)=D_{eA}(f(x_1,y_1),\ldots,f(x_{K/2},y_{K/2}))$$

Payment with Electronic Cash

Next, a description will be given of how the user US makes a payment to a shop SH with the electronic cash C issued from the bank BK. The following processing is carried out for each i (where i=1,2, . . . , K/2).

Step 1: The user sends the electronic cash C to the shop SH.

Step 2: The shop SH creates a random bit $e_i$ and sends it to the user US.

Step 3: The user supplies the shop SH with $a_i$ and $y_i$ when $e_i$=1 and $x_i$ and $a_i$(+)ID when $e_i$=0.

Step 4: The shop SH uses the public key $e_A$ of the bank BK to check if the electronic cash C bears a correct signature for the messages $f(x_1,y_1), \ldots, f(x_{K/2},y_{K/2})$.

Settlement

Finally, a description will be given of the settlement of an account between the shop SH and the bank BK. The shop SH presents to the bank BK a history H of communications conducted with the user US when he used the electronic cash C. The bank BK verifies the validity of the communication history H and, if it passes the verification, stores the history H and pays the money into the shop's account. Alternatively, the bank BK pays the money by some other means. When finding an unauthorized use of electronic cash, the bank BK searches the stored communication history for the data ai and $a_i$(+)ID corresponding to the electronic cash and decides the identification information ID of the malicious adversary.

According to the Chaum-Fiat-Naor scheme, the user US supplies the shop SH with the data ai or $a_i$(+)ID depending on whether the random bit $e_i$ generated at the time of payment with the electronic cash is "1" or "0"; hence, when the user US uses the electronic cash C twice without proper authorization and i-th random bits $e_i$ sent to the shop SH first and second times differ, the data ai and $a_i$(+)ID are passed to the bank BK, which can detect the user's identification information by calculating $a_i$(+)($a_i$(+)ID)=ID from the data supplied thereto. Since the bank BK makes an inquiry about K/2 bits, the probability of failure in the detection of double spending of the cash C is $2^{-K/1}$. Usually, it is recommended that K=20 or so.

Since the electronic cash system employing the aforementioned blind signature scheme can make the flow of electronic cash untraceable unconditionally, the privacy of the electronic cash user is guaranteed solely on his own responsibility. That is, since the user himself adds to and removes from the blind signature the random number r for randomization, there is no possibility that anyone can learn the correspondence between the provisional and true signatures y and y' as long as the random number r is kept secret. As pointed out in the aforementioned literature by S. Von Solms and D. Naccahe, however, there is a fear that this scheme having such an unconditional anonymity feature could be abused for perfect crimes of money laundering and kidnapping because this system can make the flow of cash completely untraceable. The same goes for the electronic cash system described in Okta et al. U.S. Pat. No. 4,977,595.

SUMMARY OF THE INVENTION

It is therefore an object of the present invention to provide a method and apparatus for implementing electronic cash which, when there is a fear of money laundering or a similar crime, makes the flow of information traceable under the supervision of an authoritative third party (a court, for instance) but, in ordinary cases, makes the flow of information untraceable as before to ensure privacy protection of users.

A method for implementing traceable electronic cash according to a first aspect of the present invention comprises the following steps:

(1) a user sends a first institution public information N corresponding to his real name $ID_U$ and first secret information;

(2) the first institution recognizes the user's identity, then generates a pseudonym I for the user and manages the correspondence between at least either one of the pseudonym I and the public information N and the real name $ID_U$ in secrecy;

(3) the first institution attaches a signature to the public information N and the pseudonym I and sends the signature and the pseudonym I to the user;

(4) the user obtain a license B from the signature sent from the first institution and stores it together with the pseudonym I;

(5) the user uses the first secret information to calculate second secret information S corresponding to the pseudonym I and the public information N and holds the second secret information S;

(6) the user sends information containing at least a random number and the license B and an amount of money A to a second institution to request it to issue electronic cash;

(7) the second institution adds a signature to the received information containing the license B and sends it to the user as information containing electronic cash C;

(8) the user checks the signed information from the second institution to see if the license B bears a signature for the public information N and the pseudonym I and if the electronic cash C is usable under the license B, thereafter making a payment to a third party through the use of the random number and the second secret information S;

(9) the third party sends the second institution all information of communication with the user so as to seek a settlement concerning the electronic cash C; and

(10) when there is a likelihood of an attack, the correspondence between at least either one of the pseudonym I and public information N and the real name $ID_U$ managed by the first institution is retrieved and the pseudonym I and the public information N are made public to preclude the possibility of the attack.

To deepen the user's feelings of trust in the bank, its role may also be divided into two, for example, a role (department 1) of confirming the user's identity and a role (department 2) of issuing the license, in which case association information α is introduced between the departments 1 and 2; the department 1 manages the correspondence between the real name $ID_U$ and the association information α and the department 2 manages the correspondence between the association information α and the pseudonym I. This permits the detection of the correspondence between the pseudonym and the real name, using the association information α as a key, only when the two departments cooperate with each other.

A method for implementing traceable electronic cash according to a second aspect of the present invention comprises the following steps:

(1) a user sends a first institution public information N corresponding to his real name $ID_U$ and secret information;

(2) the first institution recognizes the user's identity, then generates a pseudonym I for the user and manages the correspondence between at least either one of the pseudonym I and the public information N and the real name $ID_U$ in secrecy;

(3) the first institution attaches a signature to the public information N and the pseudonym I and sends the signature and the pseudonym I to the user;

(4) the user obtains a license B from the signature sent from the first institution and stores it together with the pseudonym I;

(5) the user sends information containing at least a random number b and the license B and an amount of money A to a second institution to request it to issue electronic cash;

(6) the second institution adds a signature to the received information containing the license B and sends the user the signed information as information containing electronic cash C;

(7) the user makes a check to see if the license B bears a signature for the public information N and the pseudonym I and if the electronic cash C is usable under the license B, thereafter making a payment to a third party through the use of the random number and the secret information S;

(8) the third party sends the second institution all information of communication with the user so as to seek a settlement concerning the electronic cash C; and (9) when there is a likelihood of an attack, the correspondence between at least either one of the pseudonym I and public information N and the real name $ID_U$ managed by the first institution is retrieved and the pseudonym I and the public information N are made public to preclude the possibility of the attack.

An apparatus for implementing traceable electronic cash according to a third aspect of the present invention which is an institution which issues a license and electronic cash and comprises:

pseudonym generating means which receives from a user public information N and information containing the user's real name $ID_U$ and generates a pseudonym I corresponding to the real name $ID_U$;

correspondence storage means which holds at least either one of the pseudonym I and the public information N and the real name $ID_U$;

license signing means which uses a secret key for a license to sign, with a first signing function $D_{eB}$, information containing the public information and the pseudonym I and sends the user the signed information as information containing a license B; and electronic cash signing means which signs, with a second signing function $D_{eC}$, the information received from the user and containing the license B and sends the user the signed information as electronic cash information.

DESCRIPTION OF THE PREFERRED EMBODIMENTS

An embodiment of the present invention will hereinafter be described.

Figure 1:
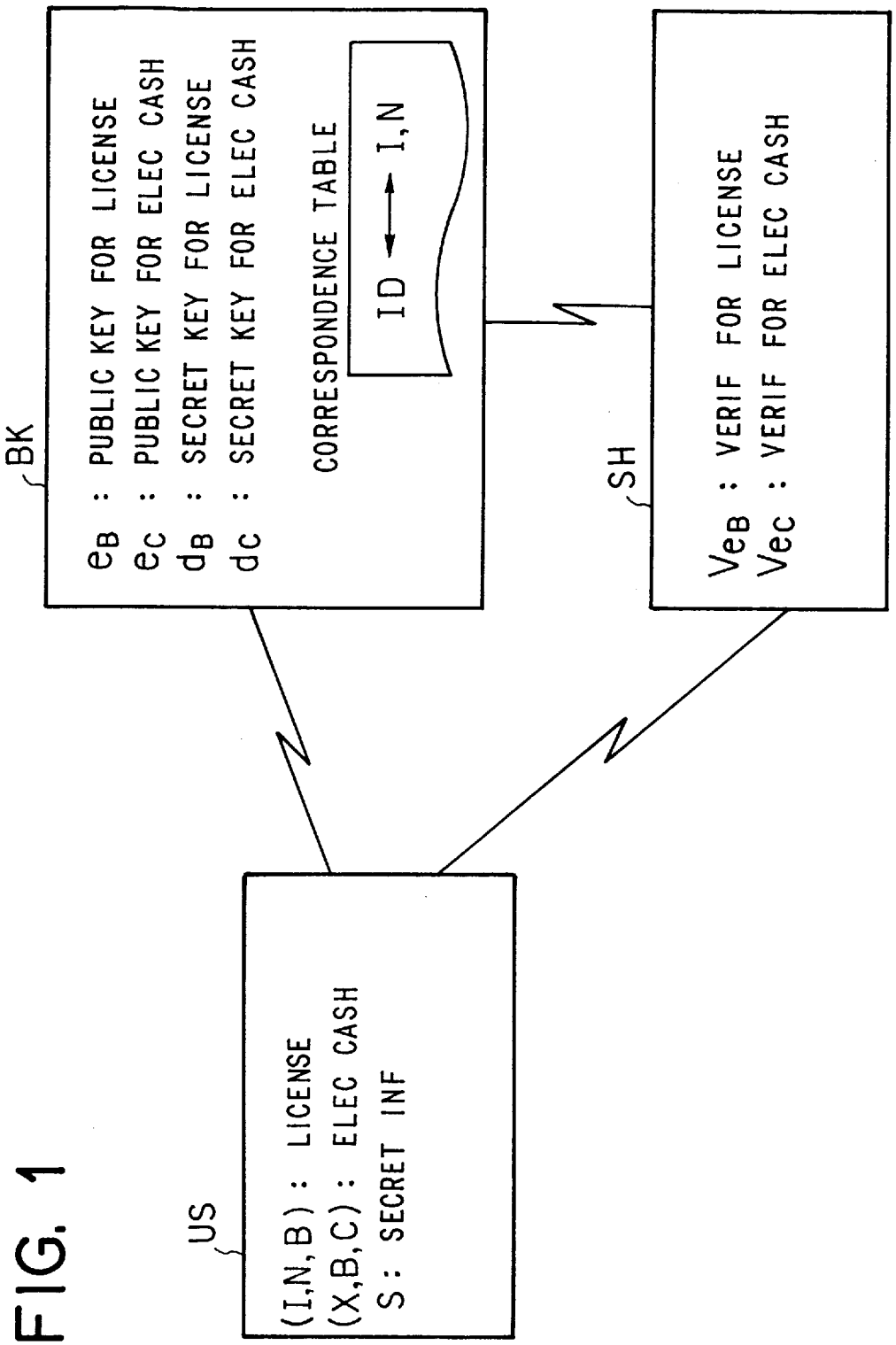
FIG. 1 is a block diagram illustrating the basic configuration of the present invention.

In FIG. 1 there is illustrated the basic configuration of the present invention, wherein the bank BK, the user US and the shop SH are interconnected via communication lines, for example, but they may also be interconnected via a smart card or the like on which information can be recorded.

First Embodiment

At the time of constructing the electronic cash system, the bank BK first generates a public key, for example, $e_B$ and a secret key, for example, $d_B$ and makes the key $e_B$ public. The public key $e_B$ is used by individual users to generate and verify a license when they join the electronic cash system. The user has the license B for the use of electronic cash issued by a trustee. In this embodiment, the bank BK serves also as a trustee that issues the license.

Next, the bank BK generates a public key, for instance, $e_C$ and a secret key, for instance, $d_C$ for the generation and verification of electronic cash. The pair of keys ($e_C$, $d_C$) differs with monetary values of coins, e.g. 100 yen, 500 yen, 1000 yen and 10000 yen.

The bank BK holds signature generating algorithms $D_B$ and $D_C$ and makes public the public keys $e_B$ and $e_C$ corresponding to these signature algorithms. As the signature scheme, the conventional RSA digital signature scheme or some other blind signature schemes can be used. The public key $e_B$ is used to check the validity of the license that the bank BK issues and the public key $e_C$ is used to check the validity of electronic cash that the bank BK issues. The user US uses identification $ID_U$ such as the number of his bank account.

License Issue Processing

To begin with, the user has the license B issued by the bank BK when he opens an account at the bank BK, for instance. To be precise, the license is expressed by {B, (I,N,L)}, but for brevity, it will hereinafter be identified by B. The procedure for the user US to have the license issued by the bank BK is such as described below (See FIG. 2). This procedure is one that each user US carries out only once when he opens an account at the bank BK.

Step 1: The user US generates two large prime numbers P and Q by a prime generator 210 and calculates a composite number N (where N=P×Q) by a multiplier 211. Further, the user US selects a prime number L by the prime generator 210 and fixes it. Then the user US stores these numbers P, Q, N and L in a memory 20M.

Step 2: The user US send the bank BK the identification information $ID_U$ together with the numbers N and L.

Step 3: The bank BK checks the identity of the user US corresponding to the identification information $ID_U$ by some means. When the identity is verified, the bank BK generates the pseudonym I by a pseudonym generator 110 and manages the correspondence between the identification information (real name) $ID_U$ and the pseudonym I in secrecy through the use of a correspondence table 11T.

Step 4: The bank BK generates the following signature information $\Psi$ by a $D_{eB}$ calculator 112 which executes a signature generation algorithm represented by the function $D_{eB}$ and sends the signature information $\Psi$ and the pseudonym I to the user US.

$$\Psi = D_{eB}(N,L,I) = g(N\|L\|I)^{d_B} \bmod n_B \qquad (1)$$

where the symbol $\|$ represents a concatenation.

Step 5: The user US stores the received signature information $\Psi$ intact in the memory 20M as the license B in this example, together with the pseudonym I.

Step 6: The user US reads out data (I,P,Q,L) from the memory 20M and provides it to a radical root calculator 212 to calculate the secret information S given below and stores it in the memory 20M.

$$S = I^{1/L} \bmod N \tag{2}$$

With this, the procedure for issuing the license ends. In this example, the prime number L may be assigned a unique value that is generated by the user US, or a value that is common throughout the electronic cash system. In the latter case, the prime number L needs only to be held in a ROM not shown and is not stored in the memory 20M. When the data exchange for the issuance of the license is carried out over a communication line, encryption processing may preferably be used in combination. It is better to generate the pseudonym I by inputting information such as a request time, an expiration date and a consecutive number into the pseudonym generator 110 as a one-way function. Since the secret information S in step 6 is information that is needed to use electronic cash, it need not be calculated here but may also be calculated in the electronic cash payment procedure described later on.

Electronic Cash Issue Processing

Next, a description will be given of the procedure which the user US follows to have the electronic cash C issued by the bank BK. Here, as referred to previously, $e_C$ is the public key for a digital signature of the bank BK that corresponds to the monetary value (10,000 yen, for instance) which the user US specifies. To be precise, the electronic cash is expressed by (C, X), but for brevity, it will hereinafter be identified by C. The procedure for the user US to have the bank BK issue the electronic cash C is such as described below (see FIG. 3). In this instance, the user US generates verification information X based on a random number R and gets the bank BK to issue electronic cash by attaching its signature to information that combines the information X with the license B; the signature is implemented by the aforementioned blind signature scheme.

Step 1: The user US generates the random number R by a random generator 220, then stores it in the memory 20M and uses the random number and the component (N, L) of the license B to calculate by a modular exponential calculator 221 the verification information X given by the following equation:

$$X = R^L \bmod N \tag{3}$$

Further, the user US calculates $$Z = F_{eC}(X, B) \tag{4}$$

by an $F_{eC}$ calculator 222 from the license B and the verification information X read out of the memory 20M, that is, the user US performs blind signature preprocessing, and sends the bank BK the information Z together with the identification information $ID_U$ (only when needed) and a desired monetary value information (10,000 yen, for instance) of the electronic cash.

Step 2: The bank BK uses the secret key $d_C$ corresponding to the monetary value of the electronic cash to calculate by a $D_{eC}$ calculator 120

$$\Theta = D_{eC}(Z) \tag{5}$$

that is, the bank BK adds a provisional signature to the received information Z and sends it to the user US. At the same time, the bank BK withdraws the requested amount of money from the user's account or receives the amount due from the user US by some means. Incidentally, this embodiment does not involves the conventional cut-and-choose test before the bank BK attaches the provisional signature to the information Z.

Step 3: The user US calculates the electronic cash C of his specified monetary value by a $G_{eC}$ calculator 223, that is, the user US performs blind signature postprocessing to obtain the electronic cash C.

$$C = G_{eC}(\Theta) \tag{6}$$

Figure 2:
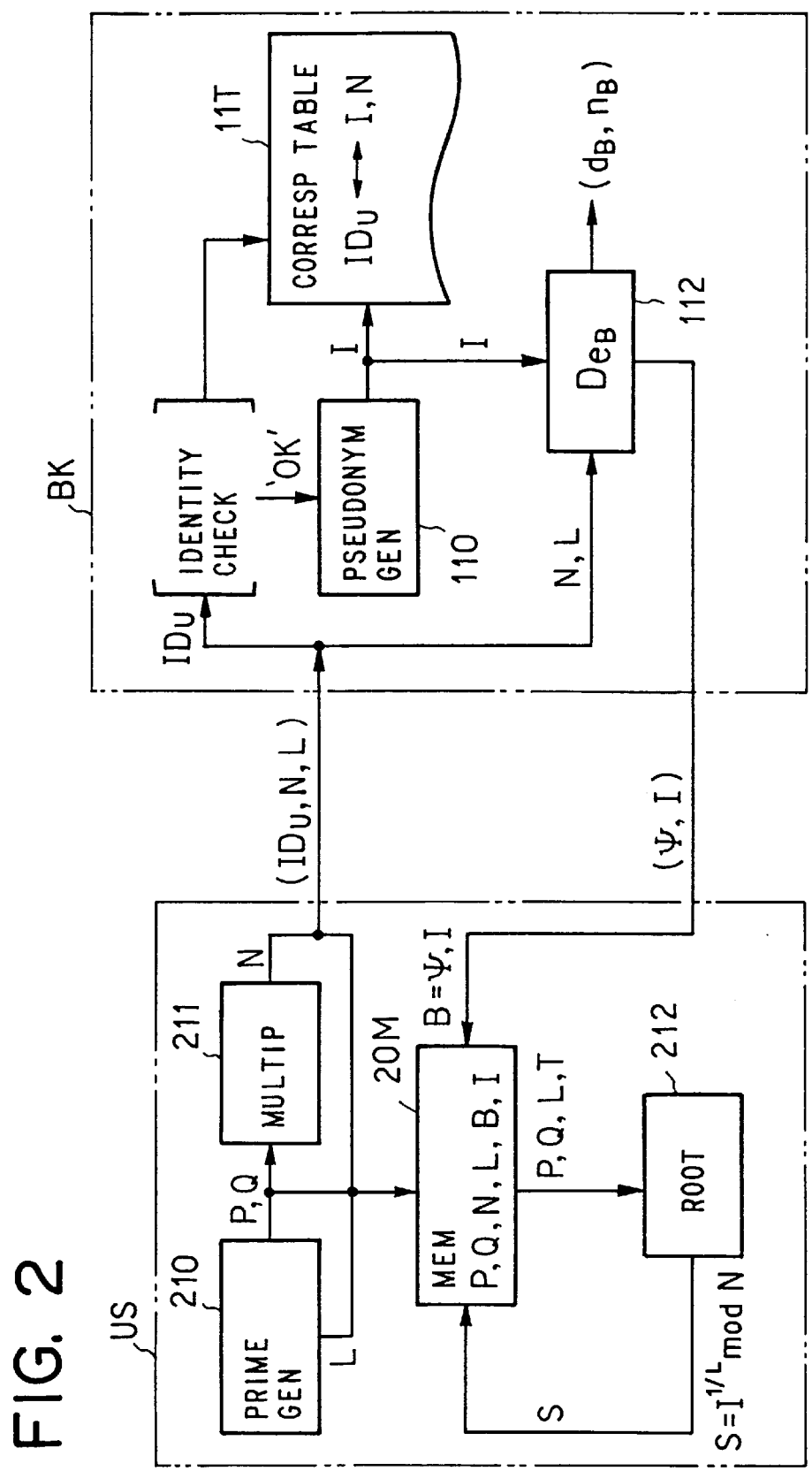
FIG. 2 is a block diagram showing license issue processing between a user and a bank.
Figure 3:
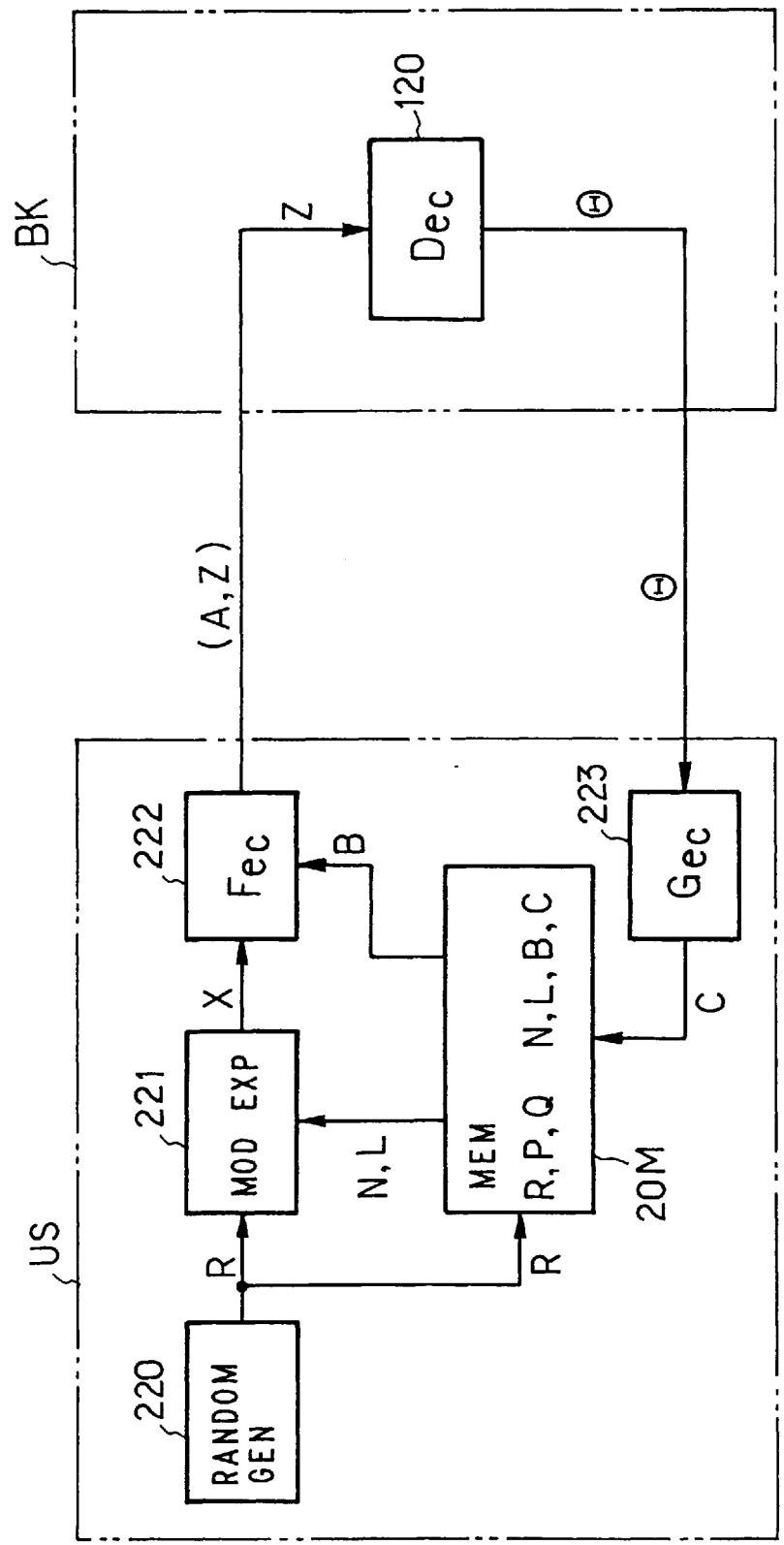
FIG. 3 is a block diagram showing electronic cash issue processing between the user and the bank.

While the bank BK that issues the license in FIG. 2 has been described to issue the electronic cash as well in FIG. 3, the user's privacy protection and the security of electronic cash could be enhanced by issuing the electronic cash in FIG. 3 from another bank or trustee.

Payment by Electronic Cash

Figure 4:
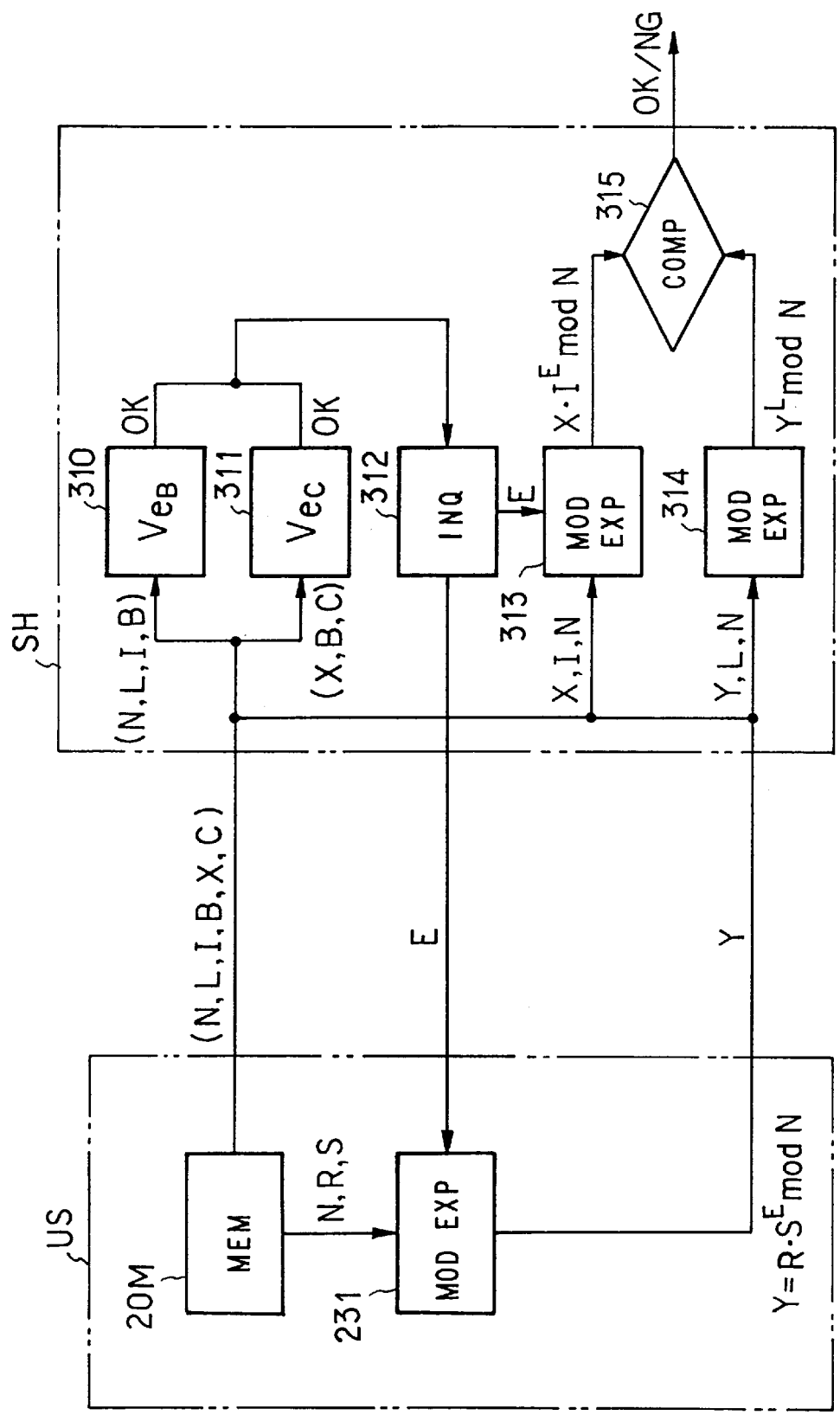
FIG. 4 is a block diagram showing processing for the payment with electronic cash between the user and a shop.

The user US executes the following steps when he makes a payment to the shop SH by the electronic cash C issued from the bank BK (see FIG. 4).

Step 1: The user US sends data (N,L,I,B,X,C) to the shop SH.

Step 2: The shop SH checks the validity of the license B for data (N,L,I) by a $V_{eB}$ calculator to see if the license B satisfies $$V_{eB}((N,L,I), B) = OK, \text{ or } B^{eB} \bmod N = (N\|L\|I) \tag{7}$$

that is, to see if the license B serves as a signature for each pieces of data N, L and I. Besides, the shop SH checks the validity of the electronic cash C for data (X, B) by a $V_{eC}$ calculator 311 to see if the electronic cash C satisfies $$V_{eC}((X, B) C) = OK, \text{ or } C^{eC} \bmod N = (X\|B) \tag{8}$$

that is, to see if the electronic cash C is usable under the license B. When the license B and the electronic cash C are both valid, the shop SH generates a inquiry $E \in Z_L = \{0, 1, \ldots, L-1\}$ by a inquiry generator 312 and sends it to the user US. If the license B and the electronic cash C are not valid, the shop SH halts this protocol.

Step 3: The user US responds to the inquiry from the shop SH to read out the secret information S and (N, R) from the memory 20M, then provides them to a modular exponential calculator 231 and calculates therein a response Y and sends it to the shop SH.

$$Y = R \cdot S^E \bmod N \tag{9}$$

Step 4: The shop SH calculates $X \cdot I^E (\bmod N)$ by a modular exponential calculator 313 and $Y^L \bmod N$ by another modular exponential calculator 314 and compares the calculated results by a comparator 315. In other words, the shop SH makes a check to see whether they satisfy the following relationship.

$$Y^L \equiv X \cdot I^E (\bmod N) \tag{10}$$

The secret information S in the response Y expressed by Eq. (9) is given by Eq. (2), so if the relationship of Eq. (10) is satisfied, the shop SH accepts the electronic cash C at a value of 10,000 yen on the assumption that the electronic cash C is correct.

In the above electronic cash payment protocol, steps 2 and 3 may be adapted to exclude a possibility of the user US and the shop SH conspiring with each other to make the bank BK deposit an undue amount of money. That is, in step 2, the shop SH generates a random number d and sends the user US its identification information $ID_S$ time t and the random number d in place of E, while at the same time the shop SH calculates E by E=f(ID$_S$,t,d). Where f is a one-way function. In step 3, the user US also calculates E by E=f(ID$_S$,t,d).

Settlement

Figure 5:
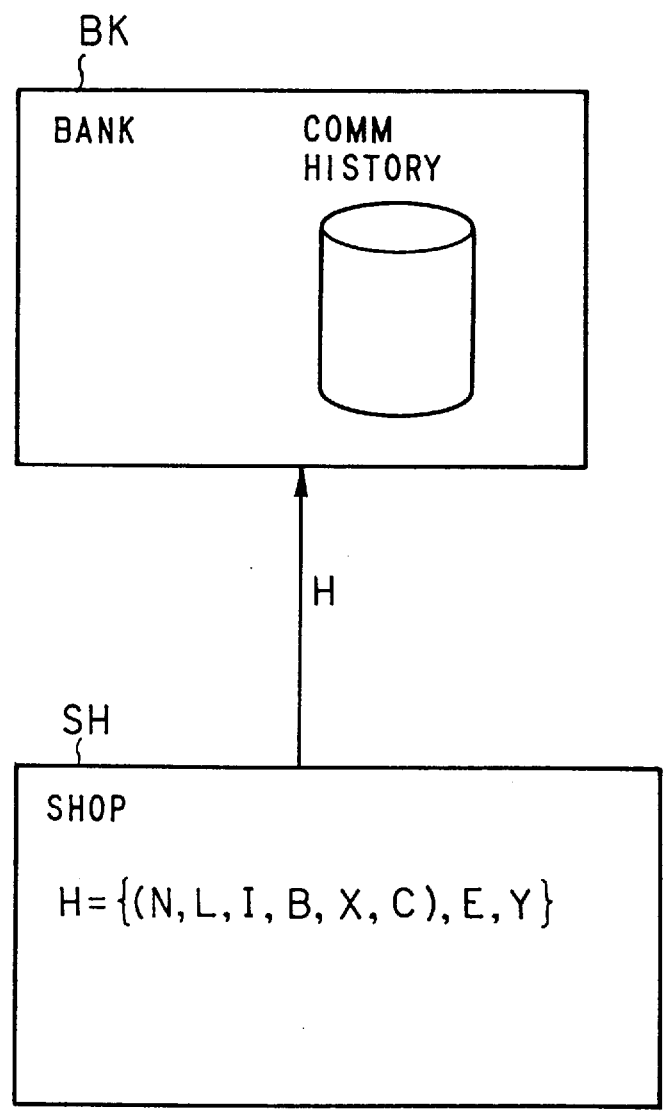
FIG. 5 is a block diagram showing settlement processing between the shop and the bank.

Finally, a description will be given of the settlement between the shop SH and the bank BK (see FIG. 5). The shop SH presents to the bank BK the entire history H of communications (i.e. interactions) made with the user US when the latter used the electronic cash, that is, (N,L,I,B, X,C), E and Y. The bank BK checks the validity of the communication history H, that is, checks it to see if Eqs. (7) and (8) both hold, and if the history H is valid, the bank BK will store it and pay the amount due in the account of the shop SH (or pays the amount due to the shop SH by some means). When detecting an unauthorized used of electronic cash, the bank BK will find the identification information ID of the malicious adversary on the basis of the correspondence between the pseudonym I and the identification information ID.

The above procedure from the issuance of electronic cash to the settlement, except for the issuance of the license, is substantially the same as in the case of processing user information $V_i$ as the aforementioned pseudonym I in the scheme described in the second embodiment in U.S. Pat. No. 4,977,595 referred to previously. Hence, the scheme for providing increased reliability, disclosed in the above-said US patent is also applicable to the present invention.

Second Embodiment

Figure 6:
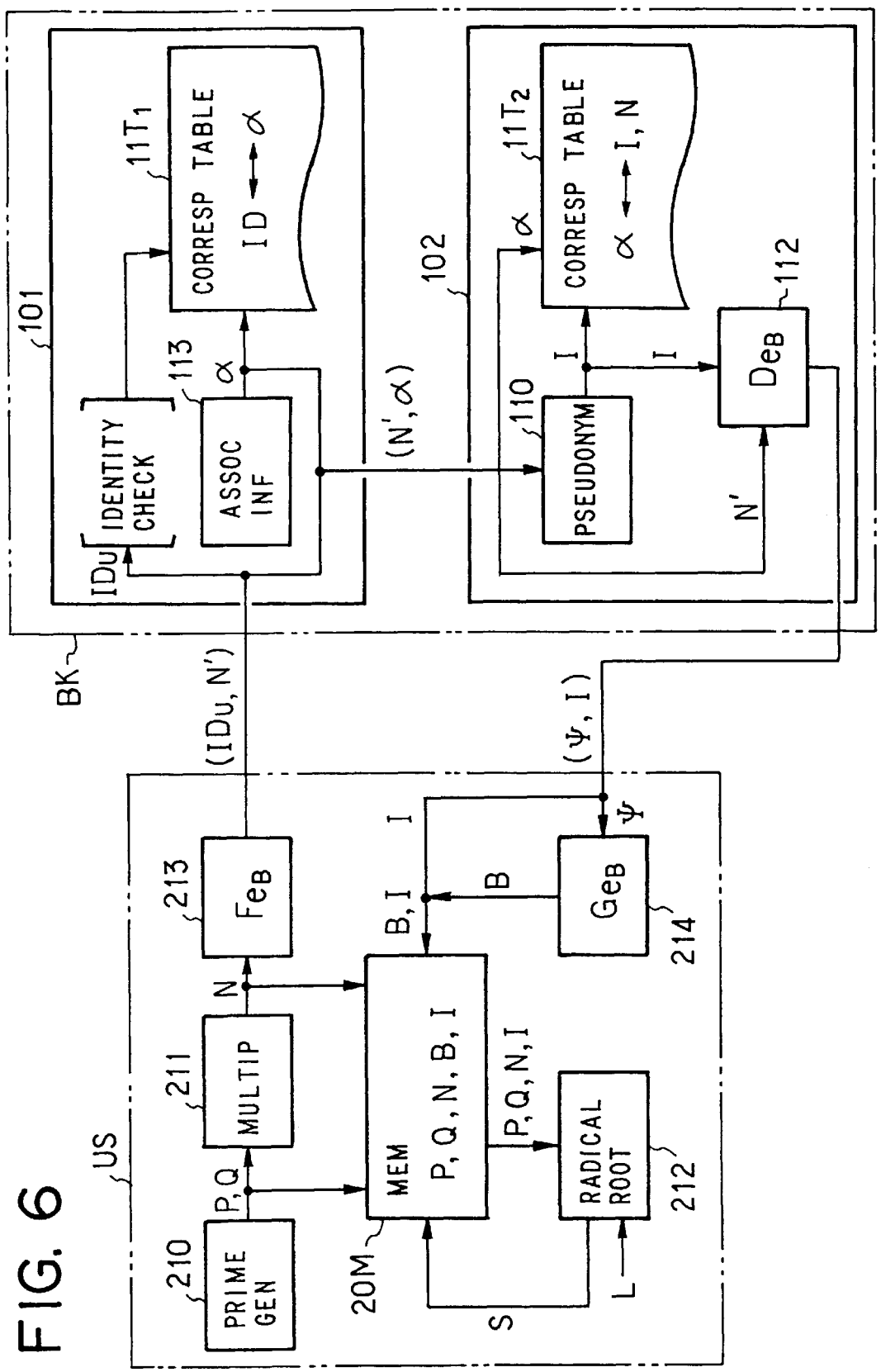
FIG. 6 is a block diagram showing another example of the license issue processing between the user and the bank.

A description will be given of an embodiment in which a plurality of electronic cash processing functions of the bank BK are carried out by different departments. In this embodiment, the bank BK is divided into a department 101 for recognizing the user's identity and a department 102 for issuing the license as shown in FIG. 6. Association or correlation information α is newly introduced between the departments 101 and 102. The department 101 manages the correspondence between the user's identification information (hereinafter referred to also as the real name) ID and the association information α, whereas the department 102 manages the correspondence between the association information α and the pseudonym I. Only when the two departments 101 and 102 cooperate with each other, can the association information α be used as the key to obtain the correspondence between the pseudonym I and the real name ID. No description will be given of the case of dividing the bank BK into three or more departments, because it could be accomplished simply by newly adding other association information (α, β, γ, . . . ).

Since this embodiment differs from Embodiment 1 in the license issuing procedure alone, this embodiment will be described only in connection with the procedure concerning the license issuance. It is assumed in this case that the parameter L is unique in the system.

The department 102 of the bank BK holds a signature generating algorithm $D_B$. The bank BK makes public the public key $e_B$ corresponding to the signature scheme. The public key $e_B$ is used to check the validity of the license issued by the bank BK. The user US uses the number of the account at the bank or the like as his identification information ID$_U$. The association information α is used between the departments 101 and 102.

License Issue Processing

In the first place, the user US has the license B issued from the bank BK when the former opens his account at the latter, for instance. To be precise, the license is expressed by (B,{I,N}) but for brevity, the license will hereinafter be identified by B. The procedure that the user US follows to have the license B issued from the bank BK is such as described below (see FIG. 6). This procedure is one that each user US executes only once when he opens his account at the bank BK.

Step 1: The user US generates the two large prime numbers P and Q by the prime generator 210, then calculates the composite number N (where N=P×Q) by the multiplier 211 and stores the numbers P, Q and N in the memory 20M.

Step 2: The user US calculates N'=F$_{eB}$(N) by an F$_{eB}$ calculator 213 and sends ID$_U$ and N' to the department 101 of the bank BK.

Step 3: The department 101 of the bank BK confirms the identity of the user US by some means and, if it is valid, generates the association information α by an association information generator 113 and manages the correspondence between the real name ID$_U$ and the association information α in secrecy on a correspondence table 11T$_1$ and supplies the department 102 with the information α and N'.

Step 4: The department 102 generates pseudonym information I by the pseudonym generator 110 and manages the correspondence between the association information α and the pseudonym I in secrecy on a correspondence table 11T$_2$.

Step 5: The department 102 calculates the following data Ψ by the D$_{eB}$ calculator 112 and sends the user US the data Ψ and the pseudonym I.

$$\Psi = D_{eB}(N' \times I) \qquad (11)$$

Step 6: The user US hands the data Ψ received from the bank BK over to a G$_{eB}$ calculator 214 to calculate the license B with B=G$_{eB}$(Ψ) and stores it in the memory 20M together with the pseudonym I.

Step 7: The user US hands data (I,P,Q) read out of the memory 20M over to the radical root calculator 212 to calculate the secret information S that satisfies the following equation and stores it in the memory 20M.

$$S = I^{1/L} \mod N$$

It must be noted here that the signature B satisfies V$_{eB}$(N×I, B)=OK.

When the above data exchange is carried out over a communication line, it may preferably be combined with encryption.

It is better to generate the pseudonym I by inputting information such as a request time, an expiration date and a consecutive number into the pseudonym generator 110 as a one-way function. Although the first and second embodiments have been described to hold the identification information ID$_U$ and the pseudonym I of the user US on the correspondence table 11T in correspondence with each other, the principle of the present invention is to exclude the user's identification information ID$_U$ from the object for the signature of the bank BK by the D$_{eB}$ calculator 112 and hold the correspondence between the object for signature and the identification information ID$_U$ on the correspondence table 11T. Accordingly, the information that is held on the correspondence table 11T may be the correspondence between the identification information ID$_U$ and the composite number N in place of the correspondence between the identification information ID$_U$ and the pseudonym I.

Third Embodiment

Figure 7:
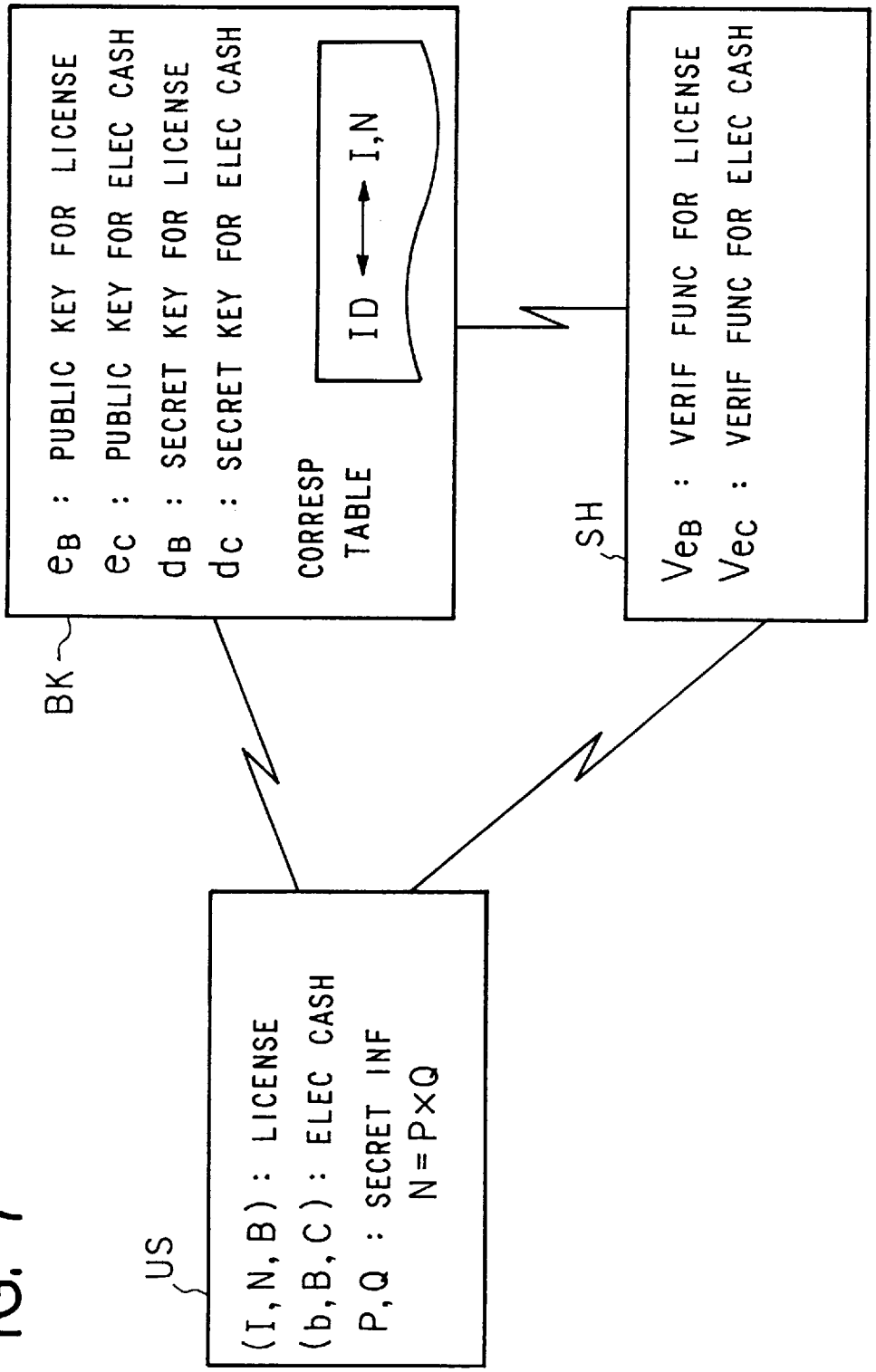
FIG. 7 is a block diagram illustrating the basic configuration of a third embodiment of the present invention.

Turning now to FIG. 7, the present invention will be described as being applied to a divisible electronic cash scheme disclosed in U.S. Pat. No. 5,224,162. This embodiment also use the same principle as does the first embodiment. The bank BK complies with the request of the user US to generate the pseudonym I corresponding to the identification information $ID_U$ and holds their correspondence in secrecy on the correspondence table and uses the pseudonym I to issue the license. Thereafter, the bank BK issues electronic cash of a certain monetary value to the user US in response to his request. The user US is allowed to repeatedly use the electronic cash for payment to third parties, e.g. shops SH until its face value is reached. Finally, each shop settles its account at the bank BK for each payment by the user US. Also in this embodiment, the correspondence between the identification information $ID_U$ and the composite number N may be held on the correspondence table in place of the correspondence between the identification information $ID_U$ and the pseudonym I.

The bank BK holds signature generating algorithms $D_B$ and $D_C$. As shown in FIG. 7, the bank BK makes public two public keys $e_B$ and $e_C$ that are used in the signature procedure which is executed for the issuance of the license and for the issuance of electronic cash. This embodiment will be described to employ the conventional RAS digital signature scheme. The public key $e_B$ is used to verify the validity of the license that is issued by the bank BK, and the public key $e_C$ is used to check the validity of the electronic cash that is issued by the bank BK. The user US uses his identification information $ID_U$ such as the number of his account at the bank BK.

For example, in the case of using the RSA digital signature as information corresponding to the license, the bank BK prepares a pair of secret and public keys $(d_A, n_A)$ and $(e_A, n_A)$ and, for the verification of the validity of the license, keeps the key $(e_A, n_A)$ public as the above-mentioned public key eB and holds the secret key $(d_A, n_A)$ as the above-mentioned secret key $d_B$. Further, when the bank BK uses the RSA digital signal as information corresponding to the monetary value of the electronic cash, the bank BK prepares a pair of secret and public keys $(d'_A, n'_A)$ and $(e'_A, n'_A)$ and, for the verification of the electronic cash, keeps the key $(e'_A, n'_A)$ public as the above-mentioned public key $e_C$ together with the monetary value assigned to the electronic cash.

In the following embodiments, the signature generating algorithm DB for the license is set as follows:

$$D_B(x) = x^{dA} \bmod n_A$$

The signature generating algorithm $D_C$ for electronic cash is set as follows:

$$D_C(x) = x^{d'A} \bmod n'_A$$

The blind signature preprocessing function $F_e$ is set as follows:

$$x = F_e(m) = r^{eA} \times m \bmod n$$

where r is a random number for randomization. The blind signature postprocessing function $G_e$ is set as follows:

$$G_e(\Psi) = \Psi/r \bmod n$$

In this embodiment, a tree-structured table, called a hierarchical structure table used in the aforementioned U.S. Pat. No. 5,224,162, is introduced for efficient realization of divisibility (that electronic cash once issued can be repeatedly used until the monetary value assigned thereto is reached).

The bank BK determines a one-way function g and three random functions $f_\Gamma$, $f_\Lambda$ and $f_\Omega$ and makes them public. These three functions are used to determine the value of each node of the hierarchical structure table (Γtable and Λtable).

Figure 8A:
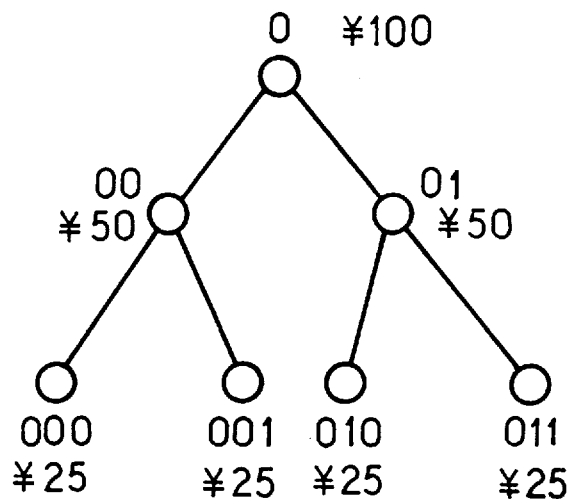
FIG. 8A shows a hierarchical structure table of usable monetary values defining the divisional use of electronic cash.
Figure 8B:
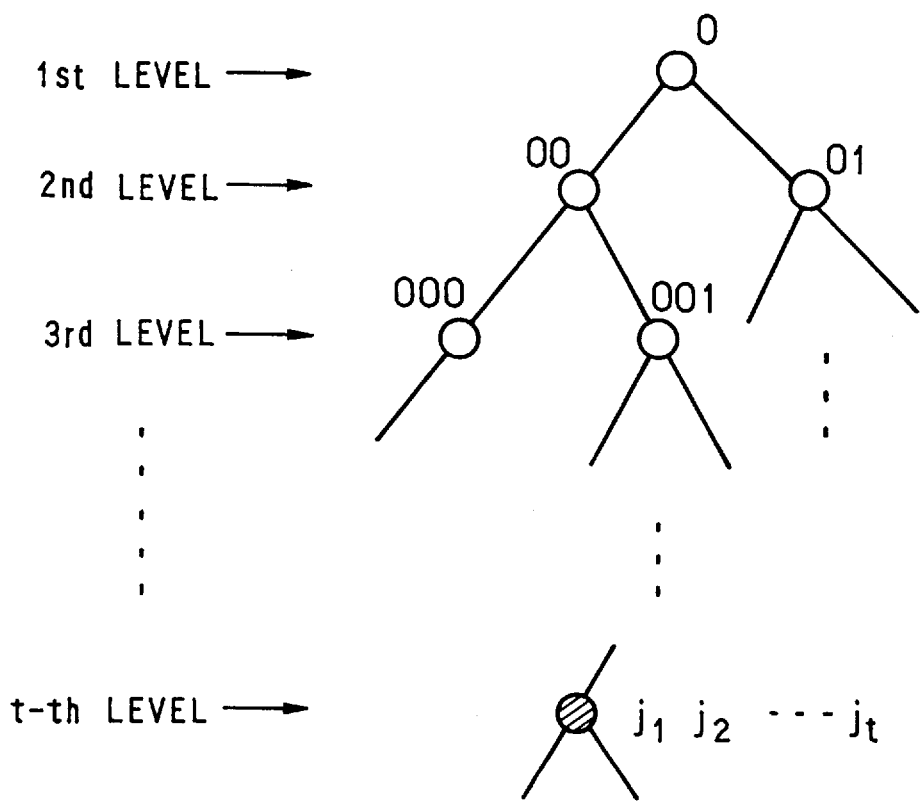
FIG. 8B is a diagram for explaining an example of use of a node in FIG. 8A.

The hierarchical structure table is determined corresponding to the monetary value of electronic cash and the minimum divisible unit value (e.g. 1 yen). In FIGS. 8A and 8B there are shown hierarchical structure tables for using electronic cash worth 100 yen in units of 25 yen. For example, in the case of spending 75 yen, the nodes concerned are a node "00" (worth 50 yen) and a node "010" (worth 25 yen). The nodes concerned are determined under the rules mentioned below.

(a) The monetary value or denomination of each node is the sum total of monetary values assigned to its immediate descendant nodes.

(b) When a node is used, all of its ancestor and descendant nodes cannot be used.

(c) No node can be used more than once.

Under these rules, it is only a node "011" (worth 25 yen) that can be used after the nodes "00" and "010" are used. That is, under the above-said rules, the total amount of money that can be spent is 100 yen at face value and the electronic cash can be spent as desired in units of 25 yen. The hierarchical structure table increases its level with an increase in the face value of the electronic cash and with a decrease in the minimum divisible unit value. For example, in the case of electronic cash that has a face value of 1 million yen and can be used in units of 1 yen, the number of levels is around 20 ($\log_2 1{,}000{,}000 \approx 20$).

Now, let it be assumed that the Γ table has t or more levels and that the node corresponding to the amount of money paid by the user US at the shop SH is $\Gamma_{j1\ldots jt}$ (and $\Lambda_{ji\ldots jt}$), where $j_1, \ldots, j_t \in \{0,1\}$. While two or more nodes usually corresponds to the amount of money paid for each transaction (two nodes correspond to the payment of 75 yen in the above example), the following description will be made of the payment processing for a single node, because the payment processing for plural nodes is a mere parallel execution of the payment processing for the single node.

The following is a list of definitions that are used in the procedures described hereinafter.

$$[x^{\frac{1}{2}t} \bmod N]_{QR} = y$$

such that $y^{2^t} = x \bmod N$, where y is a quadratic residue ($1 \leq t$).

$$[x^{\frac{1}{2}t} \bmod N]_1 = y'$$

such that $y'^{2^t} = x \bmod N$, $(y'/N) = 1$ and $0 < y' < N/2$ ($1 \leq t$).

$$[x^{\frac{1}{2}t} \bmod N]_{-1} = y''$$

such that $y''^{2^t} = x \bmod N$, $(y''/N) = -1$ and $0 < y'' < N/2$ ($1 \leq t$).

$$<z>_{QR} = dz \bmod N$$

such that $d \in \{\pm 1, \pm 2\}$ where dz mod N is a quadratic residue.

$$<z>_1 = d'z \bmod N$$

such that $d' \in \{1, 2\}$ and $(d'z/N) = 1$.

$$<z>_{-1} = d''z \bmod N$$

such that $d'' \in \{1, 2\}$ and $(d''z/N) = -1$.

In the above, (a/b) represents a Jacobi symbol. A method for calculating the Jacobi's symbol is described in, for example, Fujisaki, Morita and Yamamoto, "Take-Off for Number Theory (Special issue for seminar in mathematics)," Nippon Hyohron-sha.

License Issue Processing

To begin with, the user US has the license B issued by the bank BK. The procedure for this is basically identical with the procedure in the first embodiment shown in FIG. 2, but in this example, the prime number L is not used. Hence, the license is expressed by {B,(I,N)}, but for brevity, it will hereinafter be identified by B. Further, this embodiment does not use the user's secret information S used in the first embodiment during the use of electronic cash.

Figure 9:
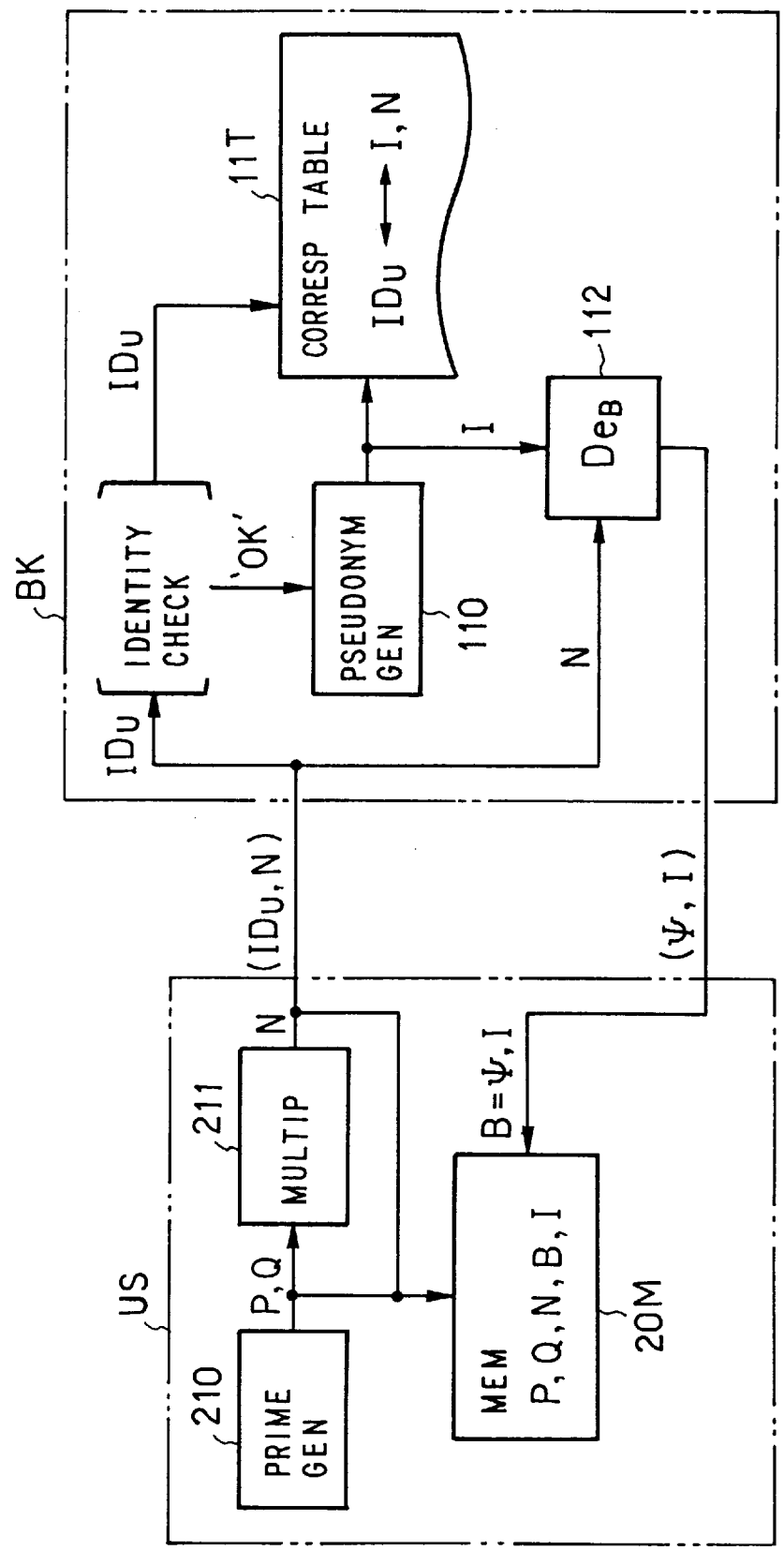
FIG. 9 is a block diagram showing license issue processing between the user and the bank in FIG. 7.

The procedure for the user US to have the license issued by the bank BK is such as described below (See FIG. 9). This procedure is one that each user US carries out only once when he opens an account at the bank BK.

Step 1: The user US generates, by the prime generator 210, two large prime numbers P and Q that satisfy conditions $P \equiv 3 \pmod 8$ and $Q \equiv 7 \pmod 8$ and calculates a composite number N (where $N=P \times Q$) of these prime numbers by the multiplier 211. Then the user US stores these numbers P, Q, and N in the memory 20M.

Step 2: The user US sends the bank BK his identification information $ID_U$ and the composite number N.

Step 3: The bank BK checks the identity of the user US by some means. When the identity is verified, the bank BK generates the pseudonym I by the pseudonym generator 110 and stores the correspondence between the identification information (real name) $ID_U$ and the pseudonym I (or N) on the correspondence table 11T and holds it secret.

Step 4: The bank BK generates the following signature $\Psi$ by the $D_{eB}$ calculator 112 and sends the signature $\Psi$ and the pseudonym I to the user US.

$$\Psi = D_{eB}(N,I) = g(N\|I)^{d_B} \bmod n_B \quad (12)$$

Step 5: The user US stores the received data $\Psi$ in the memory 20M as the license B, together with the pseudonym I.

When the data exchange between the user US and the bank BK is carried out over a communication line, encryption processing may preferably be used in combination. It is better to generate the pseudonym I by inputting information such as a request time, an expiration date and a consecutive number into the pseudonym generator 110 as a one-way function.

Electronic Cash Issue Processing

Figure 10:
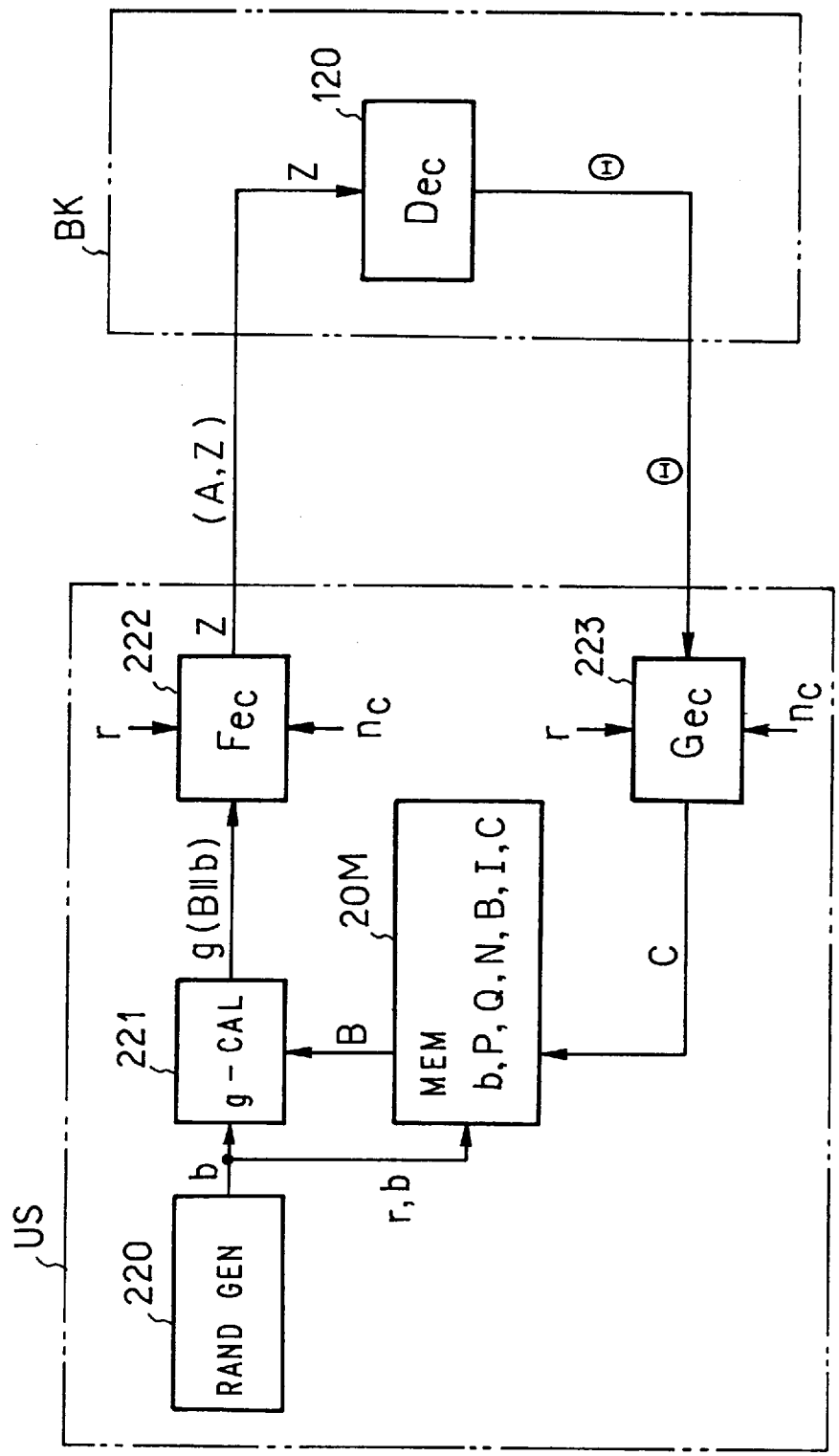
FIG. 10 is a block diagram showing electronic cash issue processing between the user and the bank in FIG. 7.

Next, a description will be given of the procedure which the user US follows to have the electronic cash C issued by the bank BK. Here, $e_C$ is the public key for the digital signature of the bank BK that corresponds to the monetary value (10,000 yen, for instance) which the user US specifies. To be precise, the electronic cash is expressed by (C,b, B), but for brevity, it will hereinafter be identified by C. The procedure for the user US to have the bank BK issue the electronic cash C is such as described below (see FIG. 10).

Step 1: The user US generates random numbers b and r by the random generator 220, then stores the random number b in the memory 20M, while at the same time he calculates $g(B\|b)$ by a one-way function g calculator 221 from the random number b and the license B read out of the memory 20M. Further, the user US calculates $$Z = F_{eC}(g(B\|b)) = r^{e_C} g(B\|b) \bmod n_C \quad (13)$$

by the $F_{eC}$ calculator 222 and sends the bank BK the information Z together with the identification information $ID_U$ (only when needed) and monetary value information A (10,000 yen, for instance) of the electronic cash.

Step 2: The bank BK uses the secret key $d_C$ corresponding to the monetary value A of the electronic cash to calculate by the $D_{eC}$ calculator 120

$$\Theta = D_{eC}(Z) = Z^{d_C} \bmod n_C \quad (14)$$

and sends it to the user US. At the same time, the bank BK withdraws the requested amount of money A from the user's account or receives the amount due from the user US by some means.

Step 3: The user US calculates the electronic cash C of his specified monetary value A by the $G_{eC}$ calculator 223.

$$C = G_{eC(\Theta)} = \Theta/r \bmod n_C \quad (15)$$

Payment by Electronic Cash

As described below, the user make a payment to the shop SH by the electronic cash C issued from the bank BK (see FIGS. 11 and 12).

Step 1: In the first place, the user US calculates the following equation by a $\Gamma$ calculator 236 from the pieces of data C, N, P and Q read out of the memory 20M, that is, calculates $f_\Gamma(C\|O\|N)$, and uses the prime numbers P and Q to make a ±1 or ±2 correction of this value, thereby obtaining a quadratic residue $\Gamma_O$ to modules N.

$$\Gamma_O = <f_\Gamma(C\|O\|N)>_{QR} \quad (16)$$

Next, the user US inputs the electronic cash C and the nodes $j_1 \ldots j_q$ corresponding to the amount of money spent, into an $\Omega$ calculator 237 to generate $\Omega_{j_1 \ldots j_q}$ (where $q=1, \ldots, t$).

$$\Omega_{j_1 \ldots j_q} = <f_\Omega(C\|j_1\| \ldots \|j_q\|N)>_1 \quad (17)$$

Further, the user US calculates the $j_{q+1}$-th power of $\Omega_{j_1 \ldots j_q}$ (where $q=1, \ldots, t$) by a power calculator 232, then conducts a modular multiplication of the above power and the quadratic residue $\Gamma_0$ to modules N by a modular multiplier 233 and uses the prime numbers P and Q to calculate, by a radical root calculator 234, a $½^t$-th root of the multiplied result to modules N, that is, the radical root X of the node value $j_1 \ldots j_t$ corresponding to the amount of money spent A.

$$X = [(\Omega_{j_1 \ldots j_{t-1}}^{2^{t-1}j_t} \Omega_{j_1 \ldots j_{t-2}}^{2^{t-2}j_{t-1}} \ldots \Omega_{j_1}^{2j_2} \Gamma_0)^{1/2^t} \bmod N]_{-1} \quad (18)$$

Step 2: The user US sends the shop SH the pieces of data I, N, X, B, b, C read out of the memory 20M and the node value $j_1, \ldots, j_t$.

Step 3: The shop SH checks the validity of the signature B for the data (I,N) by a $V_{eB}$ calculator 310 to see if the signature B satisfies $$V_{eB}((N,I), B) = OK, \text{ i.e. } B^{e_B} \bmod N = (N\|I) \quad (19)$$

that is, to see if the signature B serves as a signature for the data (N,I). Besides, the shop SH checks the validity of the signature B for data (B,b) by the $V_{eC}$ calculator 311 to see if the electronic cash C satisfies $$V_{eC}(g(B\|b), C) = OK, \text{ or } C^{e_C} \bmod N = (B\|b) \quad (20)$$

that is, to see if the electronic cash C is usable under the license B. If the license B and the electronic cash C are not valid, the shop SH halts this protocol.

Step 4: The shop SH uses a Jacobi symbol calculator 333 and a comparator 334 to check to see if X satisfies the following relationship. If not, the shop SH halts this procedure.

$$(X/N) = -1$$

Next, the shop SH calculates $$f_\Gamma(C\|O\|N)$$

by a $\Gamma$ calculator 322 from C and N. Further, the shop SH calculates $\Omega_{j_1 \ldots j_q}$ (where $q=1, \ldots, t$) by an $\Omega$ calculator 316 from C, $j_1 \ldots j_q$ and N.

$$\Omega_{j_1\ldots j_q} = <f_\Omega(C\|j_1\ldots\|j_q\|N)>_1 \quad (21)$$

The calculated result is raised by a power calculator 318 to a power to obtain $\Omega^{2j}{}_{ji\ldots iq}$. Further, a modular multiplication of the output $f_\Gamma(C\|O\|N)$ from the $\Gamma$ calculator 322 and the output from the power calculator 318 is carried out by a modular multiplier 319. On the other hand, a $2^t$-th power of the root X is obtained by a power calculator 317, then the output therefrom is applied to a modular divider 320, wherein it is divided by the output from the modular multiplier 319, and the divided output is compared with ±1 and ±2 in a comparator 321, thereby checking to see if X satisfies the following relation. If not, the shop SH halts this procedure.

$$X^{2^t} \equiv d\Omega_{j_1\ldots j_{t-1}}^{2^{t-1}j_t} \Omega_{j_1\ldots j_{t-2}}^{2^{t-2}j_{t-1}} \ldots \Omega_{j_1}^{2^{j_2}} f_\Gamma(C\|O\|N) \pmod{N} \quad (22)$$

where d represents either ±1 or ±2.

Step 5: When the verification succeeds, the shop SH chooses an inquiry value $E_i \in \{0,1\}$ (where $i=1,\ldots,K'$) by an inquiry generator 312 and sends it to the user US.

Step 6: The user US calculates $\Lambda_i$ (where $i=1,\ldots,K'$) from $C,i,j_1\ldots j_t,N,P,Q$ by the following equation through the use of a $\Lambda$ calculator 235. That is, the user US uses the prime numbers P and Q to make either the ±1 or ±2 correction to $f_\Lambda(\ )$, thereby obtain a quadratic residue $\Lambda_i$ on the composite number N.

$$\Lambda_i = <f_\Lambda(C\|j_1\|\ldots\|i\|N)>_{QR} \quad (23)$$

Where: $i=1,\ldots,K'$

Next, the user US uses the prime numbers P and Q to conduct the following calculation by a root calculator 231 and sends its result $Y_i$ to the shop SH.

$$Y_i = [\Lambda_i^{1/2} \bmod N]_{(-1)^{E_i}} \quad (24)$$

Step 7: The shop SH uses a Jacobi symbol calculator 323 and a comparator 324 to make a check to see if $Y_i$ satisfies the following relation. If this verification fails, the shop SH halts this procedure.

$$(Y_i/N) = (-1)^{E_i} \quad (25)$$

The shop SH inputs information $C,i,j_1\ldots j_t,N$ into a $\Lambda$ calculator 325, raises $Y_i$ by a power calculator 326 to $Y_i^2$, conducts a modular division of $Y_i^2$ by the output from the $\Lambda$ calculator 325 in a modular divider 327 and compares the divided output d' with ±1 and ±2 in a comparator 328, thereby checking whether the following relation is satisfied.

$$Y_i^2 \equiv d'f_\Lambda(C\|j_1\|\ldots\|j_1\|i\|N) \pmod{N} \quad (26)$$

where: $1=1,\ldots,K'$.

In the above, d' represents the value of either one of ±1 and ±2. When this verification succeeds, the shop SH accepts the payment of the amount corresponding to the nodes $j_1\ldots j_t$ by the user US on the assumption that the payment is valid.

In the above electronic cash payment protocol, the inquiry $E_i$ from the shop SH to the user US via the inquiry generator 312 may be fortified as mentioned below so as to exclude a possibility of a conspiracy between the user US and the shop SH to abuse the electronic cash system. That is, the shop SH generates a random number $E_i'$ and sends it as a substitute for $E_i$ to the user US together with the identification information $ID_S$ of the shop SH and temporal information T. The shop SH and the user US both calculate $E_i = h(ID_S\|T\|E_i')$, where h is a one-way function.

Settlement

Finally, a description will be given of the settlement between the shop SH and the bank BK (see FIG. 13). The shop SH presents to the bank BK the entire history of communications $H = \{I,N,X,B,b,C,j_1\ldots j_t,E_i,Y_i$ (where $i=1,\ldots,K')\}$ held with the user US when the latter used the electronic cash. The bank BK checks the validity of the communication history H, and if the history H is valid, the bank BK will store it and pay the amount due in the account of the shop SH (or pays the amount due to the shop SH by some means). When detecting an unauthorized use of electronic cash, the bank BK obtains the pseudonym I (or composite number N) from the communication history H and is allowed to learn the correspondence between the pseudonym I (or composite number N) by permission of a third party (a court, for instance), by which it is possible to identify the malicious adversary.

In the above, the user US cannot use twice any nodes of the hierarchical structure table for the reason given below. The information $E_i$ is selected randomly from $\{0,1\}$ (where $i=1,\ldots,K'$), so if the user US commits double spending of any one of the nodes, the bank BK is capable of factoring N on the basis of H with a probability $1-(\frac{1}{2})^{K'}$, by which it is possible for the bank BK to obtain the secret information P,Q of the user. The bank BK uses the prime factors P and Q of the composite number N as proof of the unauthorized use. It must be noted here that only the user US knows the secret information P,Q. Thus, the secret information can be used as proof of double spending to impose a penalty on the user US.

Once the user US uses a certain node of the hierarchical structure table, he can no longer use any ancestor and descendant nodes. This will be described with reference to the hierarchical structure table of FIG. 8B for the sake of brevity. When the user US uses a node "00," he sends the shop SH (ultimately the bank BK) the following information $X_{00}$.

$$X_{00} = [\Gamma_{00}^{1/2} \bmod N]_{-1}\Gamma_{00}^{1/2}$$

If the user US uses a descendant node "000" afterward, he is required to send the shop SH the following information $X_{000}$.

$$X_{000} = [\Gamma_{000}^{1/2} \bmod N]_{-1}$$

At this time, since $$[\Gamma_{00}^{1/2} \bmod N]_{-1} = X_{000}^2 \bmod N,$$

the bank BK can use the pieces of information $X_{00}$ and $X_{000}$ to factor N, by which it is possible to calculate the secret information P,Q of the user US. Similarly, if the use of the node "00" is followed by the use of its ancestor node "0" or descendant node "001," the bank BK can get the secret information P,Q of the user US.

Incidentally, in the above embodiment, t the correspondence between the real name and pseudonym of the user US is detected by the bank BK, but as described previously with respect to FIG. 6, the bank BK may also be divided into two or more departments so that the correspondence between the real name and the pseudonym could be detected only when the departments cooperate. While in the above the signature $\Psi$ has been described to be used intact as the license B, it may also be subjected to some processing for use as the license B.

Fourth Embodiment

Figure 11:
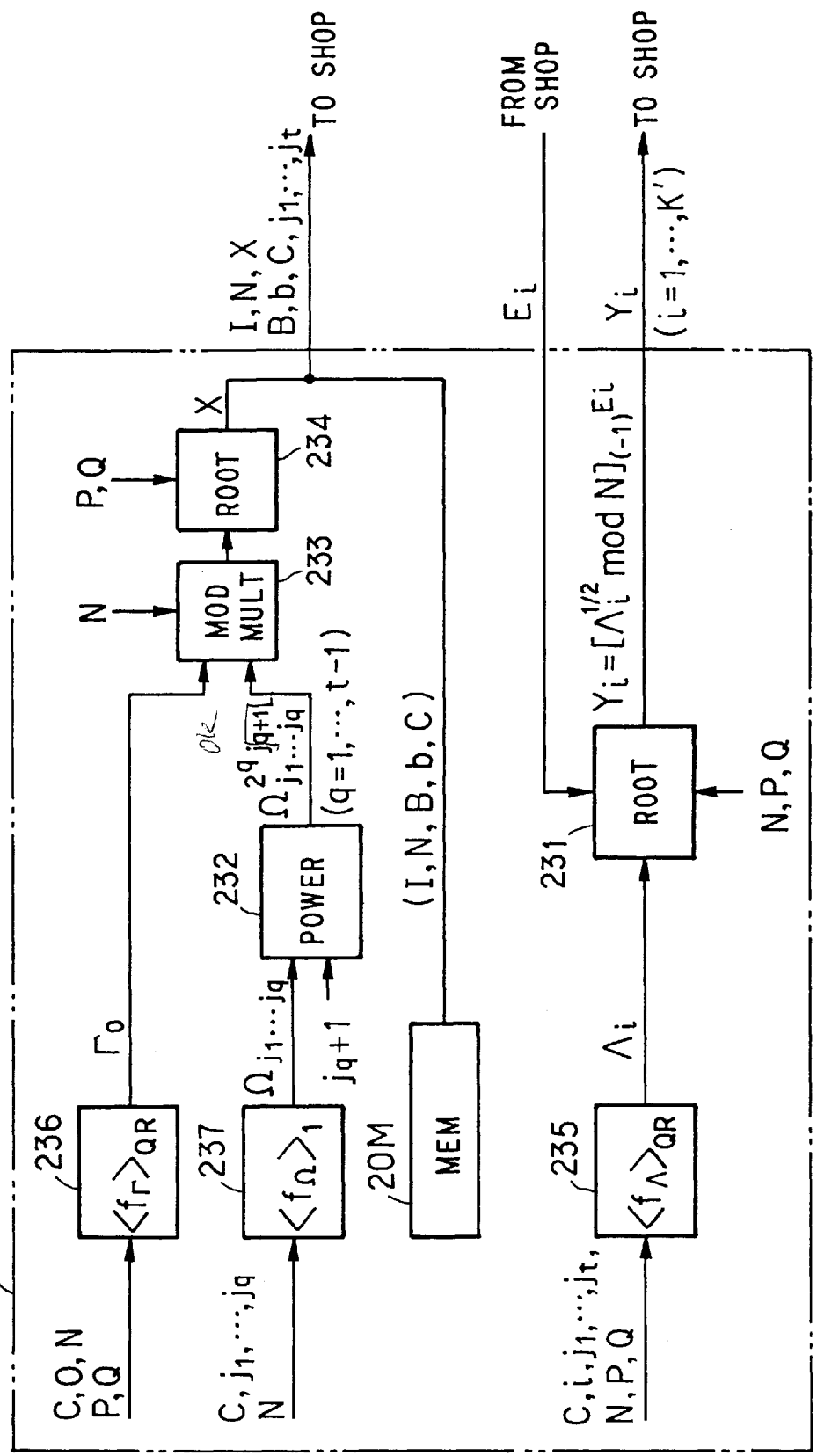
FIG. 11 is a block diagram showing processing by the user for his payment to the shop with electronic cash in FIG. 7.
Figure 12:
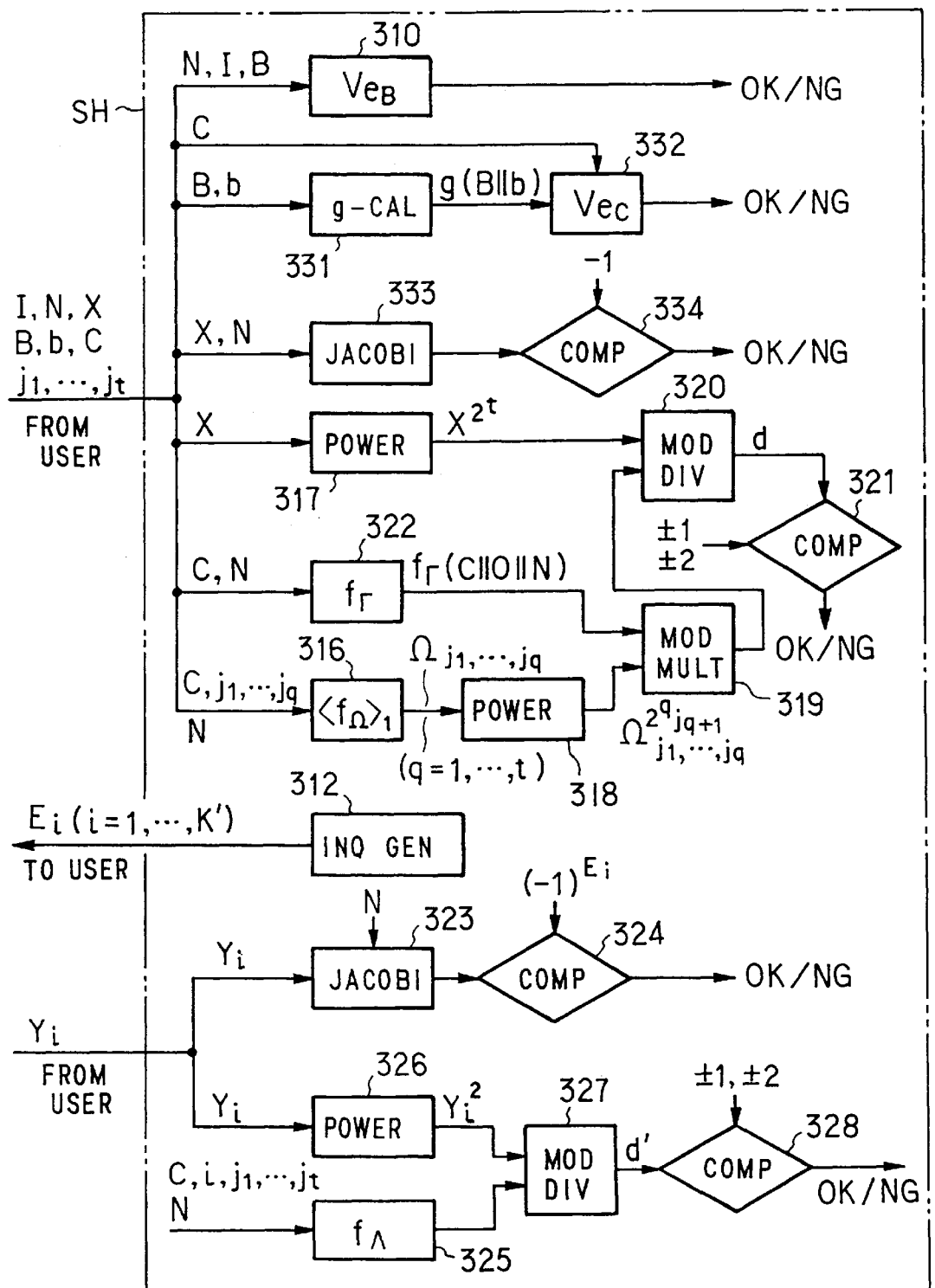
FIG. 12 is a block diagram showing processing by the shop for the payment thereto between the user and the shop in FIG. 7.
Figure 13:
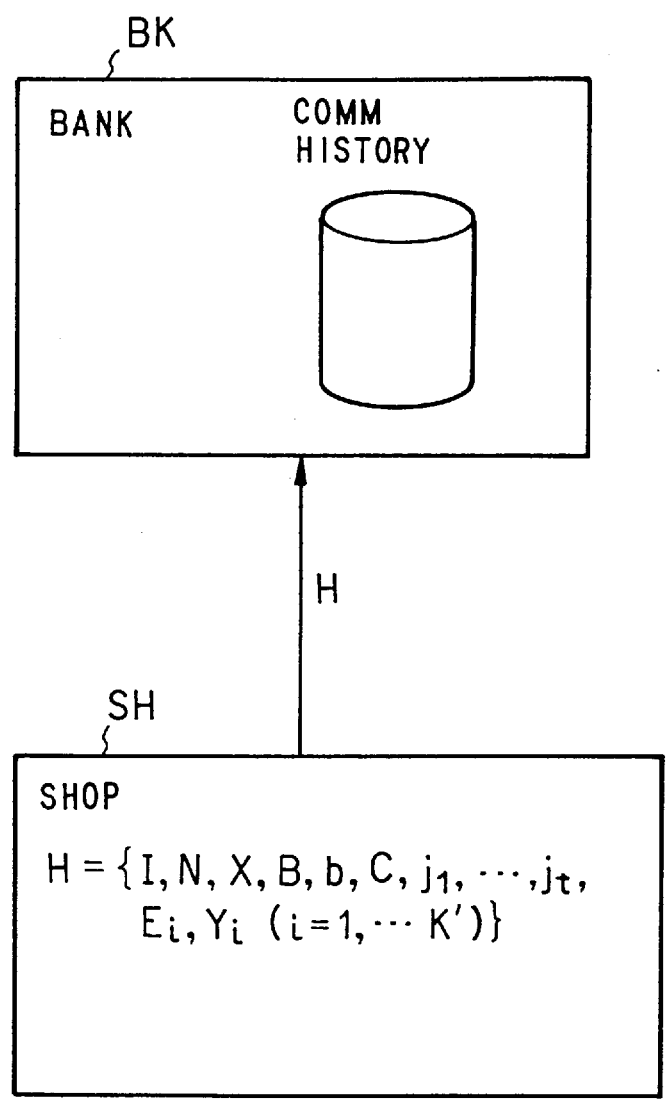
FIG. 13 is a block diagram showing settlement processing between the user and the bank in FIG. 7.
Figure 14:
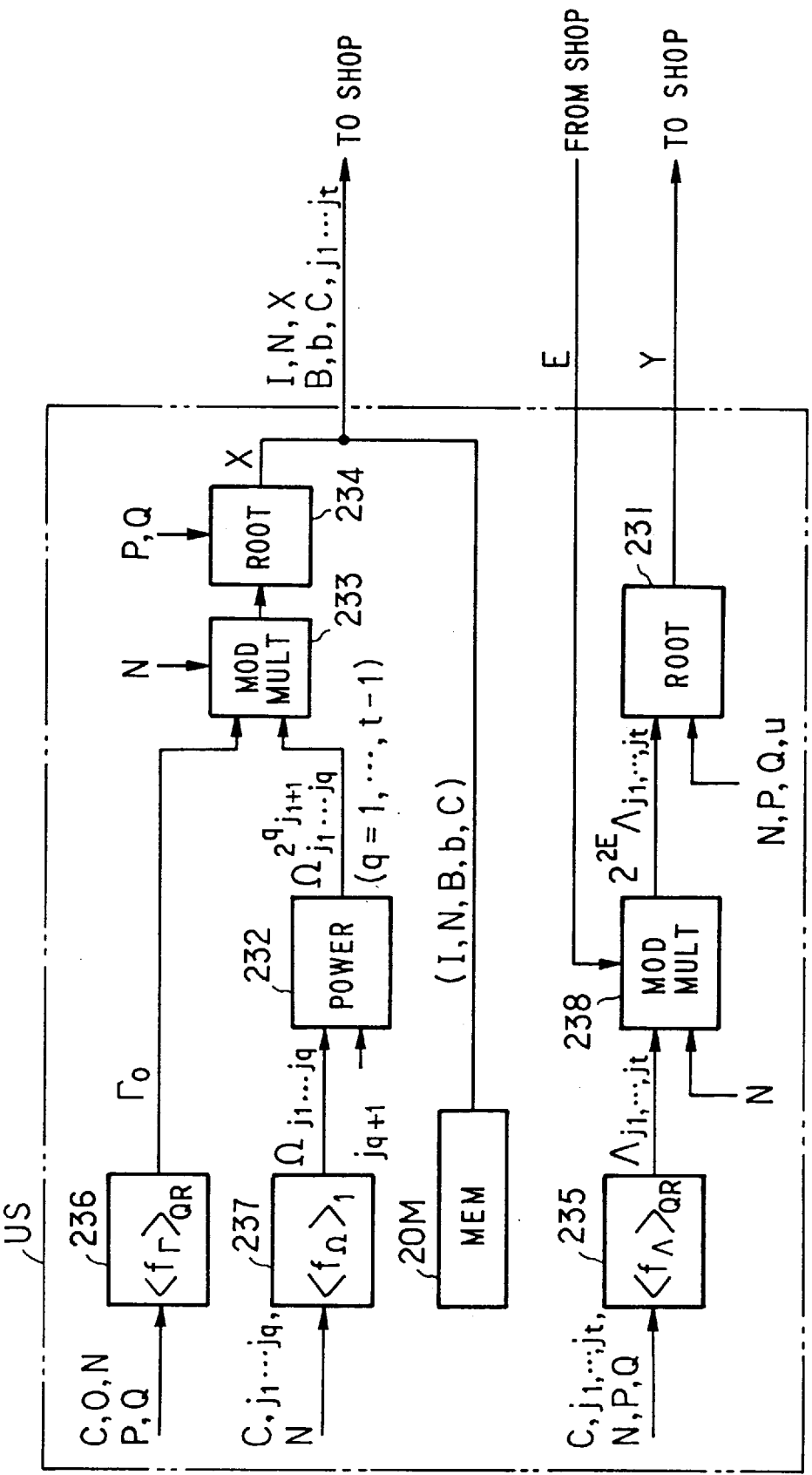
FIG. 14 is a block diagram showing the processing by the user in a modification of the processing for the payment with electronic cash between the user and the shop in FIGS. 11 and 12.
Figure 15:
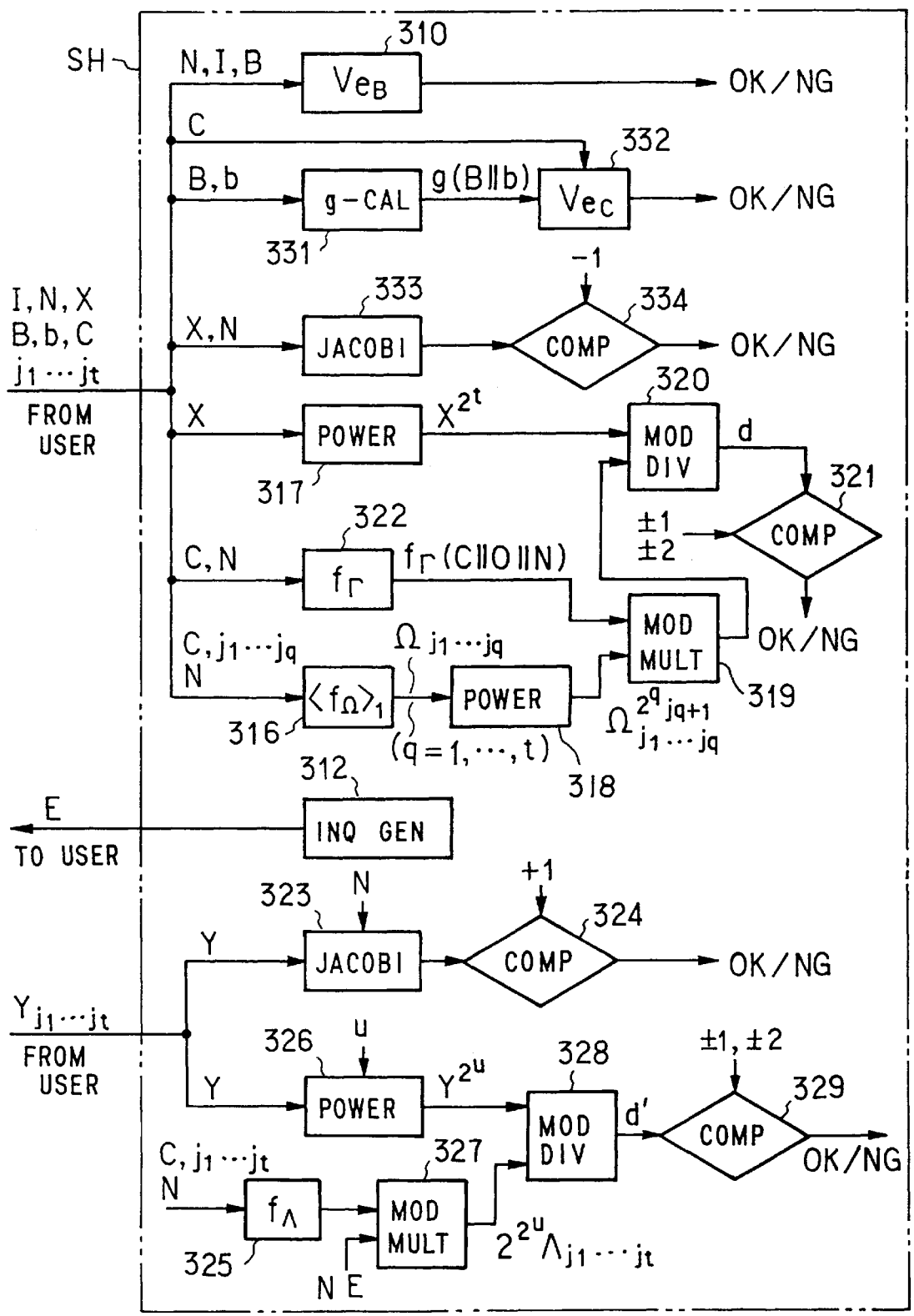
FIG. 15 is a block diagram showing the processing by the shop in the modification of the processing for the payment with electronic cash between the user and the shop in FIGS. 11 and 12.

In FIGS. 14 and 15 there are illustrated the configurations of the user US and the bank BK improved to reduce the amount of information that is transferred between them shown in FIGS. 11 and 12 when the user US spends the electronic cash in the third embodiment depicted in FIGS. 7 to 13. The procedure for the payment by the electronic cash is also illustrated.

Step 1: The user US first calculates $f_\Gamma(C\|0\|N)$ by the $\Gamma$ calculator 236 on the basis of the information C,N,P,Q read out of the memory 20M, then uses the prime numbers P and Q to make a ±1 or ±2 correction of the calculated value and calculates a quadratic residue $\Gamma_0$ modules N by Eq. (16) mentioned previously.

Next, the user US inputs the electronic cash C, the node $j_1 \ldots j_q$ corresponding to the amount of money spent and the composite number N into the $\Omega$ calculator 237 to generate $\Omega_{j_1 \ldots j_q}$ (where q=1, ..., t) by the aforementioned Eq. (17).

Further, the user US calculates the $j_{q+1}$-th power of $\Omega_{j1 \ldots jq}$ (where q=1, ..., t) by the power calculator 232, then conducts a modular multiplication of the above power and the quadratic residue $\Gamma_0$ modules N by the modular multiplier 233 and uses the prime numbers P and Q to calculate, in a radical root calculator 234 by the aforementioned Eq. (18), a $\frac{1}{2}^t$-th root of the multiplied result to modules N, that is, the radical root X of the node value $j_1 \ldots j_t$ corresponding to the amount of money spent A.

Step 2: The user US sends the shop SH the information I,N X,B b,C read out of the memory 20M and the node value $j_1, \ldots j_t$ corresponding to the amount of money A.

Step 3: The shop SH checks the validity of the license B to the information (I,N) by the $V_{eB}$ calculator 310 to see if the license B satisfies the aforementioned Eq. (19), that is, to see if the license B serves as a signature to the data (N,I). Besides, the shop SH checks the validity of the license B to the information (B,b) by the g calculator 331 and the $V_{eC}$ calculator 332 to see if the electronic cash C satisfies the aforementioned Eq. (20), that is, to see if the electronic cash C is usable under the license B. If the license B and the electronic cash C are not valid, the shop SH halts this procedure.

Step 4: The shop SH uses the Jacobi symbol calculator 333 and the comparator 334 to make a check to see if X satisfies the relationship (X/N)=−1. If not, the shop SH halts this procedure.

Next, the shop SH calculates $f_\Gamma(C\|0\|N)$ by the $\Gamma$ calculator 322 from C and N. Further, the shop SH calculates $\Omega_{j_1 \ldots jq}$ (where q=1, ..., t) from C, $j_1 \ldots j_q$ and N by the aforementioned Eq. (21) in the $\Omega$ calculator 316.

The shop SH inputs the calculated result into the power calculator 318 to obtain $\Omega^{2j}_{ji \ldots jq}$. Further, the shop SH carries out a modular multiplication of the output $f_\Gamma(C\|0\|N)$ from the $\Gamma$ calculator 322 and the output from the power calculator 318 by the multiplier 319. On the other hand, the shop SH calculates the $2^t$-th power of X by the power calculator 317, then applies the output therefrom to the modular divider 320 for division by the output from the modular multiplier 319, and compares the divided output with ±1 and ±2 in the comparator 321, thereby checking to see if X satisfies the relation of the aforementioned Eq. (22). If not, the shop SH halts this procedure.

The steps 1 to 4 so far are exactly the same as steps 1 to 4 described previously with respect to FIGS. 11 and 12. In the modified embodiment of FIGS. 14 and 15, the subsequent steps 5 to 7 are improved to reduce the amount of information to be transferred between the user US and the shop SH but their basic procedures are the same as in steps 5 to 7 described with respect to FIGS. 11 and 12.

Step 5: When the validity of the signature of the bank BK to the license B and the usability of the electronic cash C pass the verification in step 4, the shop SH randomly chooses an inquiry value $E \in Z_u = \{0,1,2, \ldots, u-1\}$ (where u is a security parameter) by the inquiry generator 312 and sends it to the user US.

Step 6: The user US uses the information $\{C,j_1 \ldots j_t,N, P,Q\}$ read out of the memory 20M to calculate $\Lambda_{j1 \ldots jt}$ by the $\Lambda$ calculator 235. That is, the user US uses the prime numbers P and Q to make either the ±1 or ±2 correction to $f_\Lambda(\ )$, thereby obtaining a quadratic residue $\Lambda_{j1 \ldots jt}$ on the composite number N.

$$\Lambda_{j_1 \ldots j_t} = <f_\Lambda(C\|j_1\| \ldots \|j_t\|N)>_{QR} \qquad (27)$$

Next, the user US calculates, by the modular multiplier 238 and the root calculator 231, a response $Y_{j1 \ldots jt}$ from the information N,P,Q,$\Lambda_{j1 \ldots jt}$ and the inquiry E from the shop SH and sends it to the shop SH.

$$Y_{j_1 \ldots j_t} = [(2^{2E}\Lambda_{j_1 \ldots j_t})^{1/2^U} \bmod N]_1 \qquad (28)$$

Step 7: The shop SH makes a check to see if the response $Y_{j1 \ldots jt}$ satisfies the following relation by the Jacobi calculator 323 and the comparator 324. If this verification fails, the shop SH halts this procedure.

$$(Y_{j_1 \ldots j_t}/N) = 1 \qquad (29)$$

The shop SH inputs information $C,i,j_1 \ldots j_t,N$ into the A calculator 325, provides the output therefrom and information E, N to the modular multiplier 327, inputs the response $Y_{j1 \ldots jt}$ and the information N into the power calculator 326, divides the outputs from the power calculator 326 by the output from the modular multiplier 327 in the modular divider 328 and compares the divided output with ±1 and ±2 by the comparator 329, thereby checking to see if the following relation is satisfied.

$$Y_{j_1}^{2^U} \ldots {}_{j_t} \equiv d'f_\Lambda(C\|j_1\| \ldots \|j_t\|N) \pmod{N}$$

In the above, d' represents the value of either one of ±1 and ±2. When this verification succeeds, the shop SH accepts the payment of the amount corresponding to the nodes $j_1 \ldots j_t$ by the user US on the assumption that the payment is valid.

In the above electronic cash payment procedure, as is the case with FIGS. 11 and 12, the inquiry E from the shop SH to the user US via the inquiry generator 312 may be fortified as mentioned below so as to exclude a possibility that the user US conspires with the shop SH to abuse the electronic cash system. That is, the shop SH generates a random number E' and sends it as a substitute for E to the user US together with the identification information $ID_S$ of the shop SH and temporal information T. The shop SH and the user US both calculate E=h ($ID_S\|T\|E'$), where h is a one-way function.

Figure 16:
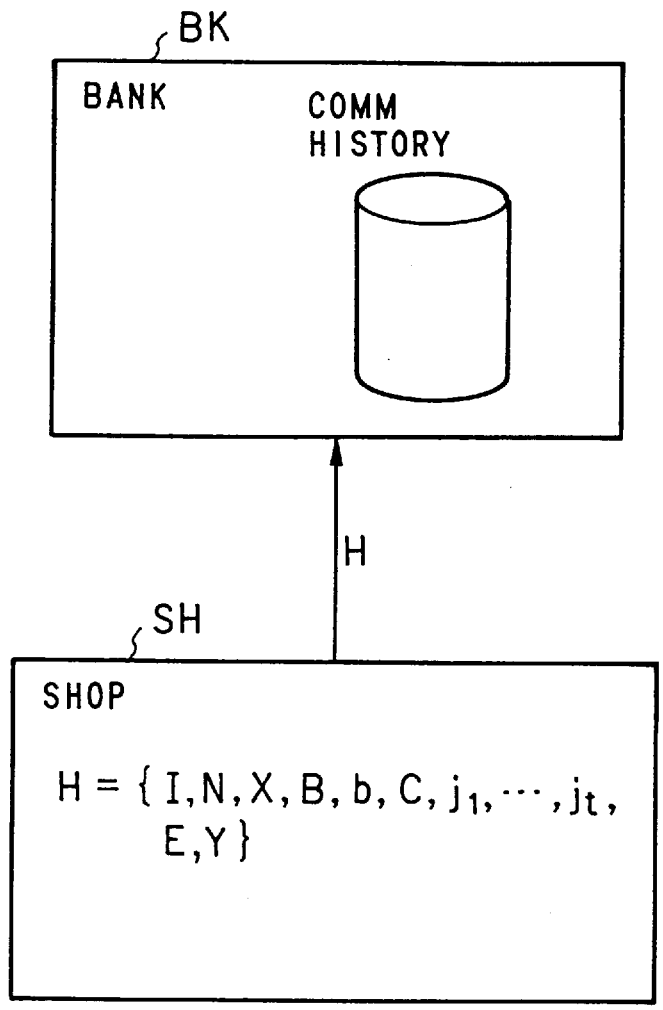
FIG. 16 is a block diagram showing the processing between the shop and the bank for the settlement of the payment with electronic cash in FIGS. 14 and 15.

The settlement between the shop SH and the bank BK shown in FIG. 16 is also basically identical with the settlement depicted in FIG. 13. The shop SH presents to the bank BK the history of communication H=$\{I,N,X,B,b,C,j_1 \ldots j_t,E,Y\}$ held with the user US when he used the electronic cash C. The bank BK checks the validity of the history H and, if it passes the verification, stores it and deposits the amount due in the account of the shop SH (or pays the amount due to the shop SH by some other means). In the event that the bank BK detects an unauthorized use of electronic cash, the bank BK calculates the pseudonym I (or composite number N) from the communication history H and is allowed to learn the identification information ID corresponding to the pseudonym I (or N) with the permission of a third party (a court, for instance), and hence can identify the malicious adversary.

Also in the embodiment illustrated in FIGS. 14, 15 and 16, the user US is not allowed to use twice any nodes of the hierarchical structure table for the reasons given below. The information E is selected randomly from $Z_u=\{0, 1, \ldots, u-1\}$, so if the user US commits double spending of any one of the nodes, the bank BK is capable of factoring N on the basis of H with a probability $(1-1/u)$, by which it is possible for the bank BK to obtain the secret information P,Q of the user US. The bank BK uses the prime numbers P and Q of the composite number N as proof of the unauthorized use (only the user US knows the secret information P and Q). Thus, the secret information can be used as proof of double spending to impose a penalty on the user US.

As described previously, in the embodiment of FIGS. 11 and 12, it is necessary for the user US to generate K' responses $Y_i$ in response to the K' inquires E' from the shop SH and sends them to the shop SH. In contrast to this, in the modified embodiment of FIGS. 14 and 15, the shop SH randomly selects one inquiry E and sends it to the user US, who needs only to generate and sends one response $Y_{j1 \ldots jt}$ to the shop SH in response to the inquiry E from the latter—this permits reduction of the amount of information to be exchanged between them. Further, the amount of information of the communication history H that is sent to the bank BK is also reduced, and hence the storage capacity for storing the communication history H by the bank BK is also decreased accordingly.

For example, according to the Chaum·Fiat·Naor scheme, the shop is supposed to send to the bank BK the following K/2=10 sets of signature data as part of the communication history H that the bank BK needs to store for the detection of double spending.

$$(A_i, y_i) \text{ or } (a_i(+)ID, x_i)$$

where $i=1, \ldots, K/2$.

The signature data has a size of 1280 bits. In contrast to this, the embodiment of FIGS. 14 and 15 requires that only one piece of signature data $Y_{j1 \ldots jt}$ be transferred from the shop SH to the bank BK. The amount of information of the communication history H to be stored by the bank BK is only 512 bits, less than ½ the amount of information in the Chaum·Fiat·Naor scheme.

Figure 17:
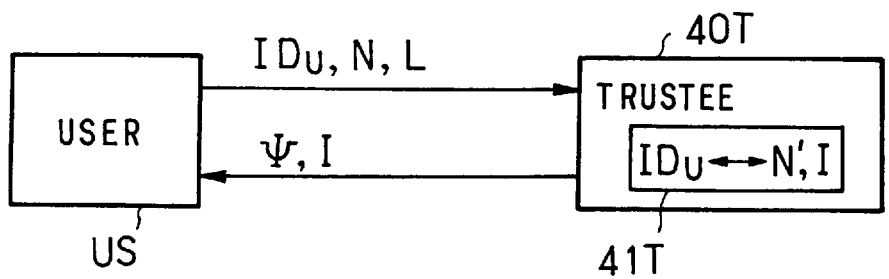
FIG. 17 is a block diagram showing an example in which a trustee issues the license.

Although in the first to fourth embodiments the bank BK has been described to issue the electronic cash C as well as the license B to the user US, it is also possible to employ a system configuration in which, for example, a trustee different from the bank BK issues the license B and the bank BK issues electronic cash and makes the settlement of payment by the electronic cash. For example, in the first embodiment the bank BK issues the license B as information Ψ as shown in FIG. 2, but a trustee 40T issues it as shown in FIG. 17. The processing facilities and configurations of the user US and the trustee 40T are exactly the same as the configurations of the user US and the bank BK depicted in FIG. 2, and hence they are not shown in FIG. 17 except for the correspondence table 41T. Similarly, the third and fourth embodiments may be modified so that a trustee issues the license B. By issuing the license B from an institution different from the bank BK, it is possible to prevent the correspondence between the real name (identification information $ID_U$) of the user US and the public information N or I from being leaked by a malicious play in the bank BK and abused or stolen by a hacker.

Figure 18:
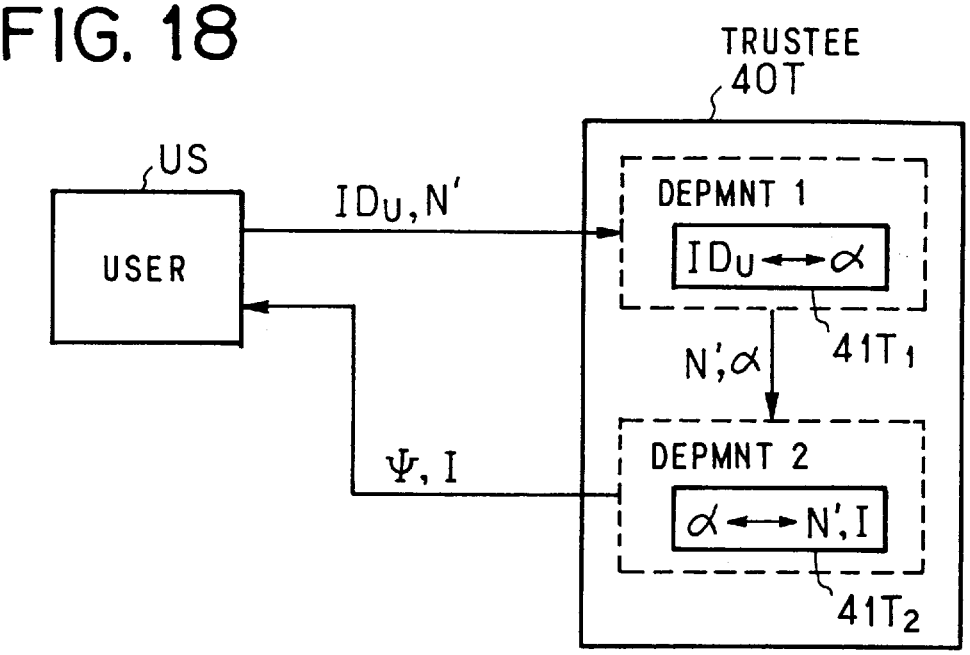
FIG. 18 is a block diagram showing an example in which a plurality of departments of the trustee in FIG. 17 hold the correspondence of identification information ID with information N and pseudonym.
Figure 19:
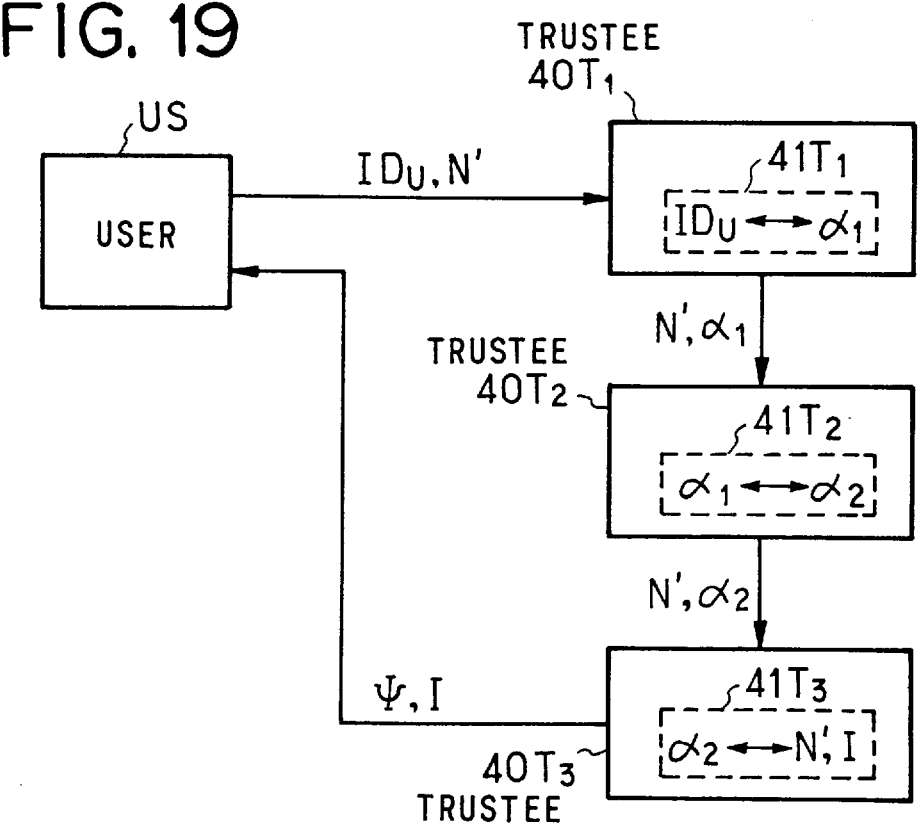
FIG. 19 is a block diagram illustrating an example of the trustee in which a plurality of departments are set up as independent trustees in FIG. 18.

Besides, as is the case with the second embodiment of FIG. 6, it is also possible to divide the internal configuration of the trustee 40T shown in FIG. 17 into a plurality of departments 401 and 402 and maintain the correspondence between the identification information $ID_U$ and association information α and the correspondence between the association information α and the information N or I in the correspondence tables 41T₁ and 41T₂, respectively, as depicted in FIG. 18. It is apparent that the departments 401 and 402 of the trustee 40T may be independent trustees as shown in FIG. 19. In the FIG. 19 embodiment, the license B is issued via three trustees 40T₁, 40T₂ and 40T₃, which store the correspondence between the identification information $ID_U$ and the association information $α_1$, between $α_1$ and $α_2$ and between $α_2$ and N' or I in their correspondence tables 41T₁, 41T₂ and 41T₃, respectively. That is, the correspondence between the identification information $ID_U$ and the public information N or I is held by the three trustees as a whole. This correspondence is clarified only when all the trustees 40T₁, 40T₂ and 40T₃ respond to a court order to reveal their stored correspondence in cooperation with one another.

Effects of the Invention

The present invention possesses such advantages as listed below.

(a) Against Crimes

To comply with a request of a authoritative or trustworthy third party (e.g. A court), the bank BK reveals the correspondence between the identification information ID and the public information (I,N), in which case transactions based on the information (I,N) are discontinued. Alternatively, the criminal concerned could be arrested by tracing the transactions based on the information (I,N).

(b) Privacy Protection

Credit cards cannot guarantee the user's privacy since the user's identification information ID is directly available to the shop. With the present invention, however, only the pseudonym I is given to the shop—this provides increased security. The Chaum·Fiat·Naor scheme uses the blind signature, and hence enables the user to protect his privacy only on his responsibility. (Attention should be paid to the argument that the use of the blind signature scheme leads to a hotbed of crimes.)

In the first embodiment, the bank could violate a user's privacy, but in the second embodiment, it is hard to violate privacy unless a plurality of departments conspire with each other.

(c) Amount of Communication and Amount of Information Stored

In the Chaum·Fiat·Naor scheme, since the user himself embeds his identification information ID in the electronic cash, the "cut-and-choose" scheme (which responds to a request for the presentation of K pieces of information and the revelation of K/2 pieces of information) so as to make a check to identify the user, operates as predetermined; hence, the amount of communication for issuance of the license inevitably increases. Additionally, the detection of double spending also poses the problem of an increase in the amount of information of the communication history H to be stored by the bank BK.

In the prior art it is recommended that K is around 20, whereas in the present invention (first to fourth embodiments) K=1 can be implemented; accordingly, the amount of communication and the amount of information to be stored can be reduced down to ¹⁄₂₀ and the above-mentioned problems can be solved.

(d) Double Spending

When the user US spends the electronic cash C twice or more, the bank BK can detects the double spending by using the information C as a key to retrieve the communication history file. Since the communication history information contains the pseudonym I together with the information C, the bank BK is allowed to learn the identification information ID corresponding to the pseudonym I with the permission of a third party (e.g. a court), and hence can detect the malicious adversary.

(e) Divisibility

In the third and fourth embodiments, if the user US spends a node against the node rule for the divisional use of the electronic cash C, the bank BK can detect it by using the radical root of the node as a key to retrieve the communication history file. Since the communication history file contains the information I (or N) together with the information C, the bank BK is allowed to learn the identification information ID corresponding to the information I (or N) with a permission of a third part (e.g. A court), and hence can detect the malicious adversary.

(f) Others

The present invention is compatible with prior art systems employing the license, such as disclosed in T. Okamoto et al, "Universal Electronic Cash," Advances in Cryptology-Crypto '91, Lecture Notes in Computer Science 576, pp.324–337, Springer-Verlag, Berlin (1991) and in U.S. Pat. No. 5,224,161, and the invention permits the implementation of a transferring function and a divisibility function which are impossible with the Chaum·Fiat·Naor scheme.

Moreover, the present invention is compatible with conventional systems employing the license, such as disclosed in T. Okamoto et al, "Disposable Zero-Knowledge Authentications and Their Applications to Untraceable Electronic Cash," Advances in Cryptology-Crypto '89, Lecture Notes in Computer Science 435, pp.481–496, Springer-Verlag, Berlin (1989) and U.S. Pat. No. 4,977,595 entitled "Electronic Cash Implementing Method and Apparatus Therefor" and the invention permits the implementation of the transferability and coupon-like use of electronic cash which are impossible with the Chaum·Fiat·Naor scheme.

In the third and fourth embodiments, since it is necessary that K'=10, the amount of information of the communication history H to be stored by the bank BK for double spending is equal to K/2=10 in the Chaum·Fiat·Naor scheme.

It will be apparent that many modifications and variations may be effected without departing from the scope of the novel concepts of the present invention.

What is claimed is:

1. A method for implementing traceable electronic cash, comprising the steps:

(1) wherein a user sends a first institution public information N corresponding to his real name $ID_U$ and first secret information;

(2) wherein said first institution recognizes the identity of said user, then generates a pseudonym I of said user and keeps secret the correspondence between at least either one of said pseudonym I and said public information N and said real name $ID_U$;

(3) wherein said first institution attaches a signature to said public information N and said pseudonym I and sends said signature and said pseudonym I to said user;

(4) wherein said user obtain a license B from said signature sent from said first institution and stores it together with said pseudonym I;

(5) wherein said user uses said first secret information to calculate second secret information S corresponding to said pseudonym I and said public information N and holds said second secret information S;

(6) wherein said user sends information containing at least a random number R and said license B and an amount of money A to a second institution to request it to issue electronic cash;

(7) wherein said second institution adds a signature to said received information containing said license B and sends it to said user as information containing electronic cash C;

(8) wherein said user checks said signed information from said second institution to see if said license B bears a signature to said public information N and said pseudonym I and if said electronic cash C is usable under said license B, thereafter making a payment to a third party through the use of said random number and said second secret information S;

(9) wherein said third party sends said second institution all information of communication with said user so as to seek a settlement concerning said electronic cash C; and

(10) wherein, when there is a likelihood of an attack, the correspondence between at least either one of said pseudonym I and said public information N and said real name $ID_U$ kept secret by said first institution is retrieved and said pseudonym I and said public information N are revealed to preclude the possibility of said attack.

2. The method of claim 1, wherein said first secret information is composed of prime numbers P and Q that bear a relationship N=P×Q;

wherein in said step (5) said second secret information S is calculated by the following equation with L as a prime number $$S = I^{1/L} \bmod N;$$

wherein in said step (6) said user:

(6-1) generates said random number R and calculates authentication information X from said public information N, said prime number L and said random number R by the following equation $$X = R^L \bmod N; \text{ and}$$

(6-2) performs blind signature preprocessing $Z=F_{eC}(X,B)$, represented by a function $F_{eC}$, for said authentication information A and said license B and sends said second institution the resulting information Z as information containing said license B, together with amount information A of said electronic cash C;

wherein in said step (7) said second institution attaches a blind signature $\Theta = D_{eC}(Z)$, represented by a function $D_{eC}$, to said information Z by using a secret key corresponding to said amount A of said electronic cash C and sends said user the resulting information $\Theta$ as information containing said electronic cash C;

wherein in said step (8): said user performs blind signature postprocessing $C = G_{eC}(\Theta)$, represented by a function $G_{eC}$, for said signature $\Theta$ to obtain said electronic cash C;

said third party checks the validity of said license B for information (N,I) and the validity of said electronic cash S for information (X,B) and, if they are proved valid, said third party sends said user a inquiry $E \in Z_L = \{0, 1, \ldots, -1\}$;

said user calculates a response Y from said second secret information S, said information (N,R) and said inquiry E by the following equation $$Y = R \cdot S^E \bmod N$$

and sends said response Y to said third party; and said third party calculates $Y^L$ and $X \cdot I^E \pmod{N}$ and makes a verification to see if the following equation is satisfied $$Y^L \equiv X \cdot I^E \pmod{N}$$

and if said verification succeeds, said third party accepts said electronic cash C as cash of said amount information A.

3. The method of claim 1, wherein a plurality of departments of said first institution use different pairs of sequentially corresponding pieces of association information α to manage the correspondence between said real name $ID_U$ of said user and at least one of said pseudonym I and said public information N so that the correspondence between at least one of said pseudonym I and said public information N and said real name is made available through said association information α only when said plurality of departments cooperate.

4. A method for implementing traceable electronic cash, comprising the steps:

(1) wherein a user sends a first institution public information N corresponding to his real name $ID_U$ and secret information;

(2) wherein said first institution recognizes the identity of said user, then generates a pseudonym I of said user and keeps secret the correspondence between at least either one of said pseudonym I and said public information N and said real name $ID_U$;

(3) wherein said first institution attaches a signature to said public information N and said pseudonym I and sends said signature and said pseudonym I to said user;

(4) wherein said user obtains a license B from said signature sent from said first institution and stores it together with said pseudonym I;

(5) wherein said user sends a second institution information containing at least a random number b and said license B and an amount of money A to request said second institution to issue electronic cash;

(6) wherein said second institution attaches a signature to said information containing said license B from said user and sends said user said signed information as information containing electronic cash C;

(7) wherein said user checks said signed information from said second institution to see if said license B bears a signature to said public information N and said pseudonym I and if said electronic cash C is usable under said license B, thereafter making a payment to a third party through the use of said random number b and said secret information;

(8) wherein said third party sends said second institution all information of communication with said user so as to seek a settlement concerning said electronic cash C; and (9) wherein, when there is a likelihood of an attack, the correspondence between at least either one of said pseudonym I and said public information N and said real name $ID_U$ kept secret by said first institution is retrieved and said pseudonym I and said public information N are revealed to preclude the possibility of said attack.

5. The method of claim 4, wherein said secret information is composed of prime numbers P and Q that bear a relationship $N = P \times Q$;

wherein in said step (5) said user calculates a one-way function $g(B\|b)$ from said random number R and said license B, then performs blind signature preprocessing $Z = F_{eC}(g(B\|b))$ for said one-way function $g(B\|b)$ and sends said second institution the resulting information Z as information containing said electronic cash C, together with said amount information A;

wherein in said step (6) said second institution uses a secret key corresponding to said amount A of said electronic cash C to calculate a signature $\Theta = D_{eC}(Z)$ and sends it to said user;

wherein in said step (7) said user performs blind signature postprocessing $C = G_{eC}(\Theta)$ for said received signature $\Theta$ to obtain said electronic cash of said amount A; and wherein the procedure for the payment to said third party comprises the steps:

(7-1) wherein said user calculates $$\Gamma_0 = <f_\Gamma(C\|O\|N)>_{QR}$$

from said C, N, P and Q and generates $$\Omega_{j_1 \ldots j_q} = <f_\Omega(C\|j_1\| \ldots \|j_q\|N)>_1$$

where q=1, ..., t, from said electronic cash C and said node $j_1 \ldots j_q$ and calculates from said $\Gamma_0$, $\Omega_{j_1 \ldots j_q}$ (where q=1, ..., t), N, P and Q, a radical root of a node value corresponding to the amount spent $$X = [(\Omega_{j_1 \ldots j_{t-1}}^{2^{t-1}j_t} \Omega_{j_1 \ldots j_{t-2}}^{2^{t-2}j_{t-1}} \ldots \Omega_{j_1}^{2j_2} \Gamma_0)^{1/2^t} \bmod N]_{-1};$$

(7-2) wherein said user sends I, N, $X_{j_1 \ldots j_t}$, B, b, c and $j_1, \ldots, j_t$ to said third party;

(7-3) wherein said third party verifies the validity of said license B for information (I,N) by checking said license B to see if it satisfies $$V_{eB}((N,I),B) = OK$$

and verifies the validity of said electronic cash C for information (B,b) by checking said electronic cash to see if it satisfies $$V_{eC}(g(B\|b),C) = OK$$

and, when said license B and said electronic cash C are valid, letting (a/b) represent a Jacobi symbol, said third party makes a check to see if $$(X/N) = -1$$

is satisfied, after which said third party calculates from said C and N $$f_\Gamma(C\|O\|N),$$

and calculates from said C, $j_1 \ldots j_q$ and N $$\Omega_{j_1 \ldots j_q} = <f_\Omega(C\|j_1\| \ldots \|j_q\|N)>_1,$$

where q=1, ..., t, and, further, uses said $f_\Gamma(C\|O\|N)$, $\Omega_{j_1 \ldots j_q}$ (q=1, ... t) and N to make a check to see if said X satisfies the following relation $$X^{2^t} \equiv d\Omega_{j_1 \ldots j_{t-1}}^{2^{t-1}j_t} \Omega_{j_1 \ldots j_{t-2}}^{2^{t-2}j_{t-1}} \ldots \Omega_{i,j_1}^{2j_2} f_\Gamma(C\|O\|N) \pmod{N},$$

where d represents the value of either one of ±1 and ±2;

(7-4) wherein when all of said verifications succeed, said third party generates an inquiry $E_i \in \{0,1\}$, where i=1, ... K' and sends it to said user;

(7-5) wherein said user uses said electronic cash C, said node value $(1, j_1 \ldots j_t)$ corresponding to the amount of money spent, said information N and said secret information P and Q to calculate $$\Lambda_i = <f_\Lambda(C\|j_1\| \ldots \|i\|N)>_{QR}$$

and uses said N, P, Q, $\Lambda_i$ and $E_i$ to calculate $$Y_i = [\Lambda_i^{1/2} \bmod N]_{(-1)^{E_1}}$$

and sends it to said third party;

(7-6) wherein said third party makes a check to see if said information $Y_i$ satisfies $$(Y_i/N) = (-1)^{E_i}$$

and verifies said $C, i, j_1 \ldots j_t$, N and $Y_i$ to see whether they satisfy $$Y_i^2 \equiv d' f_\Lambda(C\|j_1\| \ldots \|j_t\|i\|N)(\bmod N)$$

where $d' = \pm 1$ or $\pm 2$;

and, when said verification succeeds, said third party accepts said I, N, X, B, b, C, $j_1 \ldots j_t$, $E_i$ and $Y_i$ as the amount of money corresponding to said node $j_{i1} \ldots, j_{it}$;

where symbols in the above are defined as follows:

$$<Z>_{QR} = dz \bmod N$$

such that $d \in \{\pm 1, \pm 2\}$, where $dz \bmod N$ are quadratic residues;

$$[x^{1/2} \bmod N]_1 = y'$$

such that $y'^2 = x \bmod N$, $(y'/N)=1$ and $0<y'<N/2$, where $1 \leq t$, and $$[x^{1/2} \bmod N]_{-1} = y''$$

such that $y''^2 = x \bmod N$, $(y''/N)=-1$ and $0<y''<N/2$, where $1<t_0$.

6. The method of claim 4, wherein said secret information is composed of prime numbers P and Q that bear a relationship $N = P \times Q$;

wherein in said step (5) said user calculates a one-way function $g(B\|b)$ from said random number R and said license B, then performs blind signature preprocessing $Z = F_{eC}(g(B\|b))$ for said one-way function $g(B\|b)$ and sends said second institution the resulting information Z as information containing said electronic cash C, together with said amount information A;

wherein in said step (6) said second institution uses a secret key corresponding to said amount A of said electronic cash C to calculate a signature $\Theta = D_{eC}(Z)$ and sends it to said user;

wherein in said step (7) said user performs blind signature postprocessing $C = G_{eC}(\Theta)$ for said received signature $\Theta$ to obtain said electronic cash of said amount A; and wherein the procedure for the payment to said third party comprises the steps:

(7-1) wherein said user calculates $$\Gamma_O = <f_\Gamma(C\|O\|N)>_{QR}$$

from said C, N, P and Q and generates $$\Omega_{j_1 \ldots j_q} = <f_\Omega(C\|j_1\| \ldots \|j_q\|N)>_1,$$

from said electronic cash C and the node $j_1 \ldots j_t$ and calculates from said $\Gamma_0, \Omega_{j_1} \ldots_{jq}$, N, P and Q, a radical root of a node value corresponding to the amount spent $$X = [(\Omega_{j_1 \ldots j_{t-1}}^{2^{t-1} j_t} \Omega_{j_1 \ldots j_{t-2}}^{2^{t-2} j_{t-1}} \ldots \Omega_{j_1}^{2 j_2} \Gamma_0)^{1/2^t} \bmod N]_{-1};$$

where $q = 1, \ldots, t$;

(7-2) wherein said user sends said I, N, $X_{j_1 \ldots j_t}$, B, b, c and $j_1, \ldots, j_t$ to said third party;

(7-3) wherein said third party verifies the validity of said license B for information (I,N) by checking said license B to see if it satisfies $$V_{eB}((N,I),B) = OK$$

and verifies the validity of said electronic cash C for information (B,b) by checking said electronic cash to see if it satisfies $$V_{eC}(g(B\|b),C) = OK$$

and, when said license B and said electronic cash C are valid, letting (a/b) represent a Jacobi symbol, said third party makes a check to see if $$(X/N) = -1$$

is satisfied, after which said third party calculates from said C and N $$f_\Gamma(C\|O\|N),$$

and calculates from said $C, j_1 \ldots j_q$ and N $$\Omega_{j_1 \ldots j_q} = <f_\Omega(C\|j_1\| \ldots \|j_q\|N)>_1,$$

where $q = 1, \ldots, t$, and, further, uses $f_\Gamma(C\|O\|N)$, $\Omega_{j_1 \ldots j_q}$ ($q = 1, \ldots, t$) and N to make a check to see if said X satisfies the following relation $$X^{2^t} = d\Omega_{j_1 \ldots j_{t-1}}^{2^{t-1} j_t} \Omega_{j_1 \ldots j_{t-2}}^{2^{t-2} j_{t-1}} \ldots \Omega_{ij_1}^{2 j_2} f_\Gamma(C\|O\|N)(\bmod N),$$

where d represents the value of either one of $\pm 1$ and $\pm 2$;

(7-4) wherein when all of said verifications succeed, said third party generates an inquiry $E \in Z_U = \{0,1,\ldots, u-1\}$ and sends it to said user;

(7-5) wherein said user uses said electronic cash C, said node value $(1, j_1 \ldots j_t)$ corresponding to the amount of money spent, said information N and said secret information P and Q to calculate $$\Lambda_{j_1 \ldots j_t} = <f_\Lambda(C\|j_1\| \ldots \|j_t\|N)>_{QR}$$

and uses said N, P, Q, $\Lambda_i$ and $E_i$ to calculate $$Y_{j_1 \ldots j_t} = [(2^{2E} \Lambda_{j_1 \ldots j_t})^{1/2^U} \bmod N]_1$$

and sends it to said third party;

(7-6) wherein said third party makes a check to see if said information $Y_{j_1 \ldots j_t}$ satisfies $$(Y_{j_1 \ldots j_t}/N) = 1$$

and verifies said $C, i, j_1 \ldots j_t$, N and $Y_i$ to see whether they satisfy $$Y_{j_1}^{2^U} \ldots {}_{j_i} \equiv d' f_\Lambda(C\|j_1\| \ldots \|j_i\|N)(\bmod N)$$

where d'=±1 or ±2;

and, when said verification succeeds, said third party accepts said I, N, X, B, b, C, $j_1 \ldots j_i$, $E_i$ and $Y_i$ as the amount of money corresponding to said node $j_1, \ldots, j_i$;

where symbols in the above are defined as follows:

$$<Z>_{QR} = dz \bmod N$$

such that d∈{±1, ±2}, where dz mod N are quadratic residues;

$$[x^{\frac{1}{2}t} \bmod N]_1 = y'$$

such that $y'^{2^t} = x \bmod N$, (y'/N)=1 and 0<y'<N/2, where 1≦t, and $$[x^{\frac{1}{2}t} \bmod N]_1 = y''$$

such that $y''^{2^t} = x \bmod N$, (y''/N)=1 and 0<y''<N/2, where 1<$t_0$.

7. The method of claim 5 or 6, wherein letting ($e_B,n_B$) represent a public key of an RSA scheme used by said first institution and setting $$n_B = P \times Q,$$

$$e_B \times d_B \equiv 1 (\bmod L) \text{ and}$$

$$L = LCM\{(P-1),(Q-1)\},$$

said signature attached by said first institution to said information (N,I) in said step (3) is carried out by the following calculation $$D_{eB}(N,I) = (N,I)^{dB} \bmod n_B$$

and said verification of the validity of said license B for said information (N,I) in said step (7-3) succeeds when the following equation is satisfied:

$$(N,I) \equiv B^{eB} (\bmod n_B).$$

8. The method of claim 5 or 6, wherein letting ($e_C,n_C$) represent a public key of an RSA scheme used by said first institution, setting $$n_C = P \times Q,$$

$$e_C \times d_C \equiv 1 (\bmod L) \text{ and}$$

$$L = LCM\{(P-1),(Q-1)\},$$

setting the function of said blind signature preprocessing $F_{eC}$ by said user in said step (5) as follows:

$$Z = F_{eC}(m) = r^{eC} \times m \bmod n_C,$$

setting the function of said signature $D_{eC}$ by said second institution in said step (6) as follows:

$$\Theta = D_{eC}(Z) = Z^{dC} \bmod n_C$$

and setting the function of said blind signature postprocessing $G_{eC}$ by said user in said step (7) as follows:

$$C = G_{eC}(\Theta) = \Theta/r \bmod n_C,$$

said verification of the validity of said electronic cash C for said information (B,b) by said third party in said step (7-3) succeeds when the following equation is satisfied:

$$(B,b) \equiv C^{eC} (\bmod n_C).$$

9. The method of claim 1, 3, or 4, wherein said first and second institutions each form part of the same bank.

10. The method of claim 1, 3, or 4, wherein said first institution is a trustee and said second institution is a bank different from said trustee.

11. The method of claim 1 or 4, wherein a plurality of departments of said first institution use different pairs of sequentially corresponding pieces of association information α to manage the correspondence between said real name $ID_U$ of said user and at least one of said pseudonym I and said public information N so that the correspondence between at least one of said pseudonym I and said public information N and said real name is made available through said association information α only when said plurality of departments cooperate.

12. The method of claim 3, wherein said plurality of departments of said first institution are a plurality of trustees and said second institution is a bank different from said plurality of trustees.

13. An institution apparatus which issues a license and electronic cash in accordance with a method for implementing traceable electronic cash, said apparatus comprising:

pseudonym generating means which receives from a user public information N and information containing the user's real name $ID_U$ and generates a pseudonym I corresponding to said real name $ID_U$;

correspondence storage means which holds a table representing a correspondence between said real name $ID_U$ and at least one of said pseudonym I and said public information N;

license signing means which uses a secret key for a license to sign, with a first signing function $D_{eB}$, information containing said public information and said pseudonym I and sends said user the signed information as information containing a license B; and electronic cash signing means which signs, with a second signing function $D_{eC}$, said information received from said user and containing said license B and sends said user said signed information as electronic cash information.

14. The apparatus of claim 13, further comprising first and second institutions, said first institution including said pseudonym generating means and said correspondence storage means and said license signing means and said second institution including said electronic cash signing means.

15. The apparatus of claim 14, wherein said first institution includes a plurality of departments, said plurality of departments respectively have association memories for storing tables representing the correspondence between said real name $ID_U$ of said user and at least one of said pseudonym I and said public information N by the use of sequentially corresponding pieces of association information $\alpha$ so that the correspondence between at least one of said pseudonym I and said public information N and said real name $ID_U$ becomes available through said pieces of association information $\alpha$ only when said plurality of departments cooperate with each other.

16. The apparatus of claim 14 or 15, wherein said first and second institutions each form part of the same bank.

17. The apparatus of claim 14 or 15, wherein said first institution is a trustee and said second institution is a bank different from said trustee.

18. The apparatus of claim 15, wherein said plurality of departments of said first institution are a plurality of trustees and said second institution is a bank different from said plurality of trustees.

* * * * *